(12) United States Patent
McClelland et al.

(10) Patent No.: US 6,353,492 B2
(45) Date of Patent: Mar. 5, 2002

(54) METHOD OF FABRICATION OF A TORSIONAL MICRO-MECHANICAL MIRROR SYSTEM

(75) Inventors: Robert William McClelland, Norwell; Noa More Rensing, West Newton; Mark Bradley Spitzer, Sharon; Paul Daniel Aquilino, Canton; Paul Martin Zavracky, Norwood, all of MA (US)

(73) Assignees: The Microoptical Corporation, Westwood; Northeastern University, Boston, both of MA (US)

( * ) Notice: Subject to any disclaimer, the term of this patent is extended or adjusted under 35 U.S.C. 154(b) by 0 days.

(21) Appl. No.: 09/753,512

(22) Filed: Jan. 3, 2001

Related U.S. Application Data

(62) Division of application No. 09/138,367, filed on Aug. 26, 1998, now Pat. No. 6,201,629.
(60) Provisional application No. 60/057,700, filed on Aug. 27, 1997.

(51) Int. Cl.[7] .......................... G02F 1/03; G02B 26/08
(52) U.S. Cl. ................. 359/254; 359/223; 359/296; 359/298
(58) Field of Search ................... 359/223, 224, 359/290, 291, 295, 298, 315, 318, 245, 247, 254

(56) References Cited

U.S. PATENT DOCUMENTS

| | | | |
|---|---|---|---|
| 4,317,611 A | 3/1982 | Petersen | 350/6.6 |
| 4,421,381 A | 12/1983 | Ueda et al. | 333/186 |
| 5,078,479 A | 1/1992 | Vuilleumier | 359/290 |
| 5,097,354 A | 3/1992 | Goto | 359/212 |
| 5,233,456 A | 8/1993 | Nelson | 359/214 |

(List continued on next page.)

FOREIGN PATENT DOCUMENTS

JP 60-107017 6/1985

OTHER PUBLICATIONS

A Novel Two Axis Actuator For High Speed Large Angular Rotation, Vijay R. Dhuler et al., 6/16–19/97, Transducers '97, pp. 327–330.*
Electrostatic Micro Torsion Mirrors For An Optical Switch Matrix, Hiroshi Toshiyoshi et al., *Journal of Microelectromechanical Systems*, vol. 5, No. 4, Dec. 1996, pp. 231–237.*
Surface–Micromachined Electrostatic—Comb Driven Scanning Micromirrors for Barcode Scanners, Meng–Hsiung Kiang et al., 9th Annual Workshop on Micro Electro–Mechanical Systems 1996, San Diego, CA, pp. 192–197.*

(List continued on next page.)

*Primary Examiner*—Huy Mai
(74) *Attorney, Agent, or Firm*—Weingarten, Schurgin, Gagnebin & Lebovici LLP

(57) ABSTRACT

A torsional micro-mechanical mirror system includes a mirror assembly rotatably supported by a torsional mirror support assembly for rotational movement over and within a cavity in a base. The cavity is sized sufficiently to allow unimpeded rotation of the mirror assembly. The mirror assembly includes a support structure for supporting a reflective layer. The support structure is coplanar with and formed from the same wafer as the base. The torsional mirror support assembly includes at least one torsion spring formed of an electroplated metal. An actuator assembly is operative to apply a driving force to torsionally drive the torsional mirror support assembly, whereby torsional motion of the torsional mirror support assembly causes rotational motion of the mirror assembly. In another embodiment, a magnetic actuator assembly is provided to drive the mirror assembly. Other actuator assemblies are operative to push on the mirror assembly or provide electrodes spaced across the gap between the mirror assembly and the base. A process for fabricating the torsional micro-mirror is provided. The torsional micro-mirror is useful in various applications such as in biaxial scanner or video display systems.

10 Claims, 20 Drawing Sheets

U.S. PATENT DOCUMENTS

| | | | |
|---|---|---|---|
| 5,444,566 A | 8/1995 | Gale et al. | 359/291 |
| 5,552,924 A | 9/1996 | Tregilgas | 359/224 |
| 5,567,334 A | 10/1996 | Baker et al. | 216/24 |
| 5,583,688 A | 12/1996 | Hornbeck | 359/291 |
| 5,600,383 A | 2/1997 | Hornbeck | 348/771 |
| 5,606,447 A | 2/1997 | Asada et al. | 359/199 |
| 5,629,790 A | 5/1997 | Neukermans | 359/198 |
| 5,677,784 A | 10/1997 | Harris | 359/290 |
| 5,696,619 A * | 12/1997 | Knippe et al. | 359/224 |
| 5,808,780 A | 9/1998 | McDonald | 359/290 |
| 5,835,256 A | 11/1998 | Huibers | 359/291 |
| 5,912,608 A | 6/1999 | Asada | 335/222 |
| 5,914,801 A | 6/1999 | Dhuler et al. | 359/230 |
| 5,920,417 A | 7/1999 | Johnson | 359/223 |
| 5,999,303 A * | 12/1999 | Drake | 359/224 |
| 6,134,042 A * | 10/2000 | Dhuler et al. | 359/224 |

OTHER PUBLICATIONS

Electrostatically Deflectable Polysilicon Torsional Mirrors, M. Fischer et al., *Sensors and Actuators A44*, 1994, pp. 83–89.*

Surface Micromachined Scanning Mirrors, Kent Erik Mattsson, *Microelectronic Engineering*, 1992, pp. 199–204.*

A Magnetically Actuated MEMS Scanning Mirror, Raanan A. Miller et al., SPIE, vol. 2687, 1996, pp. 47–52.*

Micromachined Electromagnetic Scanning Mirrors, Raanan A. Miller et al., *Opt. Eng.*, May 1997, pp. 1399–1407.*

* cited by examiner

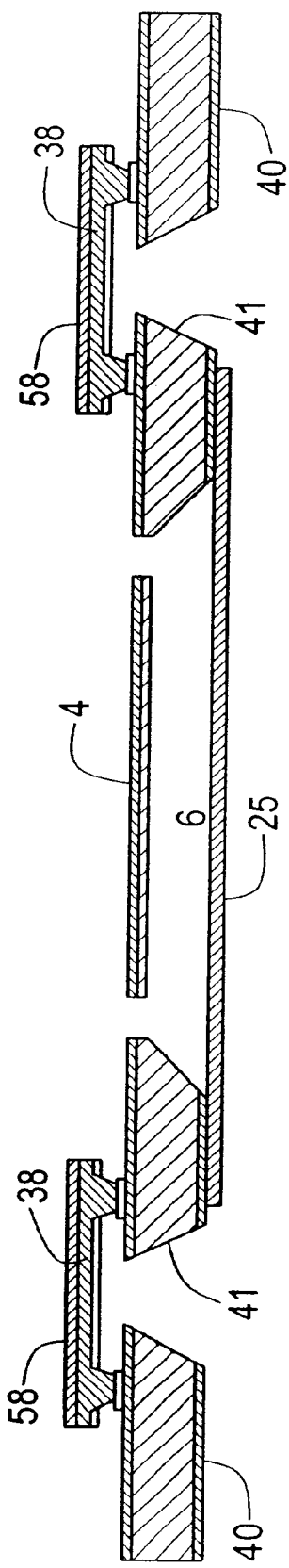
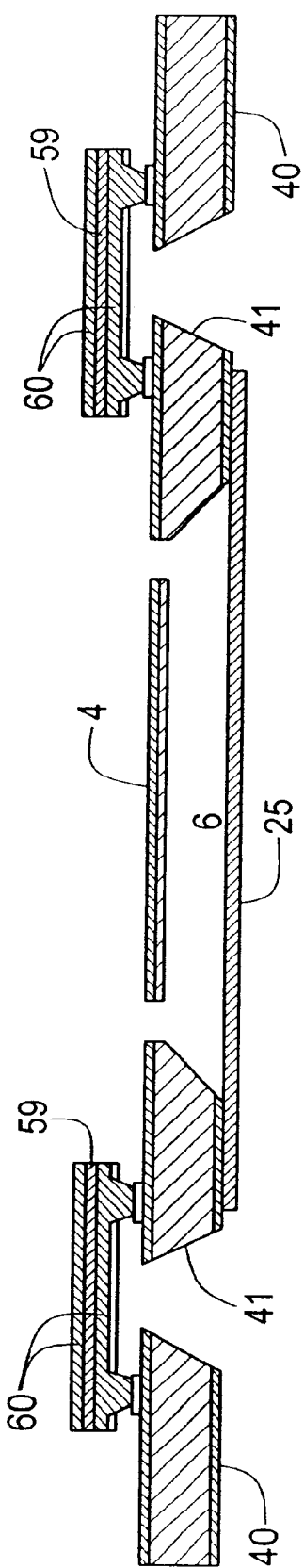

METHOD OF FABRICATION OF A TORSIONAL MICRO-MECHANICAL MIRROR SYSTEM

CROSS REFERENCE TO RELATED APPLICATIONS

This application is a division of U.S. application Ser. No. 09/138,367, filed Aug. 26, 1998, now U.S. Pat. No. 6,201,629 which claims benefit to U.S. Provisional application Ser. No. 60/057,700, filed Aug. 27, 1997.

STATEMENT REGARDING FEDERALLY SPONSORED RESEARCH OR DEVELOPMENT

The invention was made with Government support under Contract No. DAAK60-96-C-3018 awarded by the Soldier Systems Command of the United States Army. The Government has certain rights in the invention.

BACKGROUND OF THE INVENTION

Micro-electromechanical system (MEMS) mirrors (or micro-mirrors) have been evolving for approximately two decades as part of the drive toward integration of optical and electronic systems, for a range of uses including miniature scanners, optical switches, and video display systems. These structures consist of movable mirrors fabricated by micro-electronic processing techniques on wafer substrates (for example silicon, glass, or gallium arsenide). The torsional micro-mirror typically comprises a mirror and spring assembly suspended over a cavity formed in or on a base. The mirrors are electrically conductive, as is at least one region behind the mirror, affixed to the stationary base, so that an electric field can be formed between the mirror and the base. This field is used to move the mirror with respect to the base. An alternative comprises the use of magnetic materials and magnetic fields to move the mirrors.

Typically the mirror surface consists of either the wafer itself or a deposited layer (metal, semiconductor, or insulator), and generally in the prior art the springs and mirror are formed from the same material (but not in all cases). The mirror and torsion springs are separated from the base by an etch process, resulting in the formation of a cavity between the mirror and base.

For display or image acquisition applications, the goal is to develop compact systems with rapid frame rates (at least 60 Hz) and high resolution, consisting of between 200 and 2000 miniature pixels per line. For scanning system designs in this range, the mirrors should be large (in the range of 200 $\mu$m×200 $\mu$m to 2 mm×2 mm), fast (in the range of between 3 kHz and 60 kHz for resonant devices), and scan a photon beam through a large angle 7 to 40 degrees).

In optical systems that contain very small elements, diffraction by the smallest element may introduce diffraction broadening and deleteriously increase the final pixel size. Enlarging the limiting element reduces this broadening and militates for larger mirrors. However, as mechanical systems get larger (for example, increasing the size of a torsional mirror), they tend to be characterized by greater mass and consequently lower resonant frequency; this resonant frequency sets the scanning speed of the system. A frequency in the range of 5 to 50 kHz is desirable. Prior art mirror designs have been limited by the difficulty inherent in obtaining a high resonant frequency with a large mirror size, free from diffraction broadening effects. In prior art cases in which the mirror mass is made very low to obtain high resonant frequency, the resultant reduction in stiffness of the mirror is a limiting factor in the quality of the reflected image. This problem is exacerbated by the possibility of heating of the mirror by light absorbed in the mirror. Such heating militates for a thick mirror capable of conducting the heat away from the source.

The scanning angle through which the mirror moves determines the number of distinguishable pixels in a display or imaging system. Therefore, a large scanning angle is desirable. Generally in the prior art the scan angle is limited by the presence of electrodes that interfere with mirror motion (but not in all cases).

Electrostatic actuation is the most common method used to drive micro-mirrors. In order to produce a force, a voltage is generated between two electrodes, usually the plates of a parallel plate capacitor, one of which is stationary and the other of which is attached to the mirror as described previously. By making the mirror an electrical conductor, the mirror itself can be made to serve as one of the plates. The force generated for a given voltage depends on the plate area and on the gap between the plates, which may change as the mirror position changes. For torsional mirrors, the important drive parameter is the torque, and the effective torque on the structure is also proportional to the distance between the resultant force and the axis of rotation of the mirror. Thus, a large driving force can be achieved using large capacitor plates and small gaps; by applying the force at a distance from the rotation axis, a large torque may be obtained.

In many prior art designs the criteria for a large deflection angle range tend to be in conflict with the criteria for large driving forces. The deflection angle is limited by the presence of surfaces behind the mirror. An example of a limiting surface would be the bottom of a cavity in the base etched beneath the mirror, or some other substrate on which the mirror is mounted. The maximum angle is achieved when the mirror contacts this backplane, so the small separation between the mirror and the backplane needed for generating adequate electrostatic deflection force limits the maximum angle. Accordingly, in prior art designs in which the mirror is used as one of the drive electrodes and the other electrode is on the backplane, increasing the gap reduces the force or torque obtained at a given voltage. Some prior art designs use electrodes that are offset from the main mirror body and which are connected through actuator linkages, allowing the backplane to be moved further away or even eliminated entirely. Typically, though, these electrodes have smaller active areas and shorter moment arms, which tend to reduce the effective forces and torques as well. Additionally, if as the mirror moves, the gap between the drive electrodes narrows, then the gap still may be a limiting factor for the range of motion of the structure.

A second set of design problems arises in the selection of the mirror. Prior art designs and processes do not permit the mirror to be made from very low mass material without also sacrificing structural rigidity. One of the process limitations is the use of the same material for torsion spring and mirror mass, or the same set of patterning steps for spring and mirror mass. The selection of mirror materials with a view toward the elastic or fatigue properties of the springs restricts the suitability of the material with respect to mirror mass rigidity, and also limits the optical performance of the mirrors.

In 1980, Peterson disclosed a silicon torsional micromachined mirror (U.S. Pat. No. 4,317,611; K. E. Peterson, "Silicon torsional scanning mirror,") IBM J. Res. Dev., 24(5), 1980, pp. 631–637). Both the mirror and torsion elements were patterned in a thin (134 microns) silicon wafer and retained the full thickness of the wafer. The structure was then bonded to a glass substrate, over a shallow well to allow room for the mirror motion. Actuation of the device was electrostatic. The mirror body was used as one electrode and the other electrodes were placed at the bottom of the well under the mirror. A narrow ridge in the well under the axis of rotation of the mirror was used to eliminate transverse motion of the structure. The manufacturing process for this device was relatively simple, requiring a single patterning step for the silicon and two patterning steps for the glass substrate. Its resonance frequency was about 15 kHz, and at resonance the angular displacement reached about 1°. The limitations of this device are related to the depth of the well. A 2 mm mirror touches the bottom of a 12.5 µm well at a displacement of 0.7° (1.4° total motion). Increasing the well depth to increase the range of motion is not necessarily desirable, because it proportionally reduces the torque achieved for a given voltage.

Nelson (U.S. Pat. No. 5,233,456), Baker et al (U.S. Pat. No. 5,567,334), Hornbeck (U.S. Pat. No. 5,552,924), and Tregilgas (U.S. Pat. Nos. 5,583,688 and 5,600,383) have developed and patented a series of torsional mirror designs and improvements for use in deformable mirror device (DMD) displays. These mirrors are fabricated by surface micromachining, consisting of a series of patterned layers supported by an undisturbed substrate. The DMD display uses an individual mirror at each pixel. The mirrors are therefore designed to be very small, to be operated in a bi-stable mode, and to maximize the packing fraction on the surface of the display. To minimize the gaps between the reflecting surfaces of adjacent mirrors, the support structure and drive components are fabricated in underlying layers, requiring a complicated multi-step deposition and patterning process. As with the Peterson mirror, the Hornbeck mirror is designed to serve as one of the deflection electrodes, and the others are placed behind the mirror. Owing to the small size of the mirrors (about 20 µm×20 µm), high deflection angles are attainable with reasonably small gaps. These mirrors are designed for driving at low frequencies, and for significant dwell at a given angle (on or off), rather than for continuous motion, although the early development included mirrors designed for resonant operation (U.S. Pat. No. 5,233,456). A scanned display or imager requires, however, a large mirror, and the difficulties with scaling up torsional mirrors that are driven electrostatically with plates mounted behind the mirrors prevent the Hornbeck mirrors from being easily modified for use in scanning display applications.

Toshiyoshi describes a silicon torsion mirror for use as a fiber optic switch (H. Toshiyoshi and H. Fujita, "Electrostatic micro torsion mirrors for an optical switch matrix," *J. Microelectromechanical Systems,* 5(4), 1996, pp. 231–237). The Toshiyoshi mirror is a relatively large device (400 µm on a side and 30 µm thick), which rotates about an axis close to one edge of the mirror. The mirror is defined by etching the silicon wafer from the front, and the excess wafer material is etched from the back of the wafer. It is thus suspended over a cavity in the wafer, supported by very thin (0.3 µm) metal torsion rods. The structure is then bonded onto another substrate, on which electrodes have been plated. Toshiyoshi has demonstrated separation of the mechanical properties of the springs and mirror by using silicon for the mirror mass, and metal for the springs. Actuation is electrostatic, by placing a voltage between the mirror body and the electrodes of the lower substrate. The range of motion is limited by the mirror hitting the glass substrate, at about 30°. In order to obtain the maximum deflection at an applied voltage of 80 volts, the stiffness of the torsion members must be very low, achieved by making them very thin. This also limits the resonant frequency of the structure to 75 Hz, making the approach unsuitable for a scanned display or scanned imager. Thus Toshiyoshi has not shown how the separation of the mechanical properties of the spring and mirror can be used to attain a high resonant frequency and high angular displacement.

Dhuler of the MCNC has disclosed a mirror wherein the mirror body is formed from the silicon substrate, while the supports and actuators are fabricated above the mirror plane using surface micromachined polycrystalline silicon layers (V. J. Dhuler, "A novel two axis actuator for high speed large angular rotation," Conference Record of *"Transducers '97,"* 1997). The mirror body is first defined using ion implantation of boron as an etch stop, and then by removal of the excess Si wafer from the back of the mirror. The supports and drive electrodes are offset from the top surface of the substrate by posts, which define the gap between the drive capacitor plates. Thus the mirror is free to rotate unhindered by the bottom surface of a well, while the drive torque, being applied by actuators, is not limited by a requirement for a large capacitor gap. While it represents a significant advance in the state of the art, this device suffers from certain flaws which the current invention resolves.

In the MCNC process the mirror body thickness is limited by the boron implantation process, which has limited penetration depth; the disclosed mirror was 4 µm thick. The stiffness of the mirror is limited by both its size and thickness, so larger mirrors need to be thicker to avoid deformation of the mirror surface in use. For scanning applications, flexure in the mirror leads to uncertainty in the pixel size and location and distortion of the pixel shape. The implantation process also introduces stress into the mirror body, causing deformation of the reflective surface. The supports and actuators of the MCNC device are formed in a multi-step process and, as they are non-conducting, require the separate deposition and patterning of electrodes.

Kiang describes a 200 µm×250 µm mirror that has a frequency of 15 kHz and maximum displacement of 150 (M. H. Kiang, "Surface micromachined electrostatic comb driven scanning micromirrors for barcode applications," 9th Annual Workshop on Micro Electro-Mechanical Systems, 1996, San Diego, Calif. pp. 192–197). This mirror is made of deposited and patterned surface layers, and before using it must be first rotated out of the plane of the substrate using a comb drive and locked into position using complicated hinges. This approach obviates the problem of forming a cavity behind the mirror. However, the use of surface micromachined layers means that the structural rigidity of the micro-mirror cannot be controlled (because the thickness is limited to thin (a few microns) layers). The mirror motion is obtained by electrostatic drive applied by an actuator linked to one edge of the mirror. The motion of the mirror is restricted by the actuation mechanism.

Other torsional micromirrors are mentioned in the literature (M. Fischer, "Electrostatically deflectable polysilicon torsional mirrors." *Sensors and Actuators,* 44(1), 1996, pp. 372–274; E. Mattsson, "Surface micromachined scanning mirrors," 22 *d* European Solid State Device Research Conference, Sep. 14–17, 1992, vol. 19, pp. 199–204). Most are small (less than 100 µm on a side) and have very small displacements, not suitable for scanning applications. The exceptions tend to be complicated to fabricate or actuate and suffer from the same shortcomings as the mirrors described above.

Magnetically actuated cantilevered MEMS mirrors have been disclosed by Miller et al. of the California Institute of Technology (R. Miller, G. Burr, Y. C. Tai and D. Psaltis, "A Magnetically Actuated MEMS Scanning Mirror," *Proceedings of the SPIE, Miniaturized Systems With Micro-Optics and Micromachining*, vol. 2687, pp. 47–52, Jan. 1996; R. Miller and Y. C. Tai, "Micromachined electromagnetic scanning mirrors," *Optical Engineering*, vol. 36, no. 5, May 1997). Judy and Muller of the University of California at Berkeley disclosed magnetically actuated cantilevered structures which may be used to support mirrors (Jack W. Judy and Richard S. Muller, "Magnetic microactuation of polysilicon flexure structures," *Journal of Microelectromechanical Systems*, 4(4), Dec. 1995, pp. 162–169). In both cases, the moving structures are supported by cantilever beams along one edge. They are coated with a magnetic material, and upon the application of a magnetic field at an angle to the mirror surface, the mirror rotates in the direction of the field, bending the cantilevers. Miller has also disclosed a similar mirror which uses a small coil fabricated on the moving structure to provide it with magnetic moment. In Miller's mirror, the springs are formed out of the original silicon wafer, and in Judy's mirror the springs are fabricated out of a polysilicon layer deposited for the purpose. The conduction path for the magnetic coil device is provided by a separate NiFe contact.

SUMMARY OF THE INVENTION

The invention relates to micro-machined optical-electromechanical systems (MOEMS), and, more particularly, to resonant and non-resonant torsional micro-mirrors and their method of fabrication.

The principal embodiment of the present invention comprises a mirror assembly rotatably supported over a cavity in a substrate or base. A torsional mirror support assembly is provided comprising torsional suspension springs and force pads attached to the springs and to the base. Actuation of the mirror is achieved by torsionally driving the springs via the force pads, thereby causing rotation of the mirror assembly. The upper surface of the mirror assembly may be coplanar with the surface of the base. For the case in which the micro-mirror is formed from a silicon wafer, both the base surface and the mirror surface may be formed from the original silicon wafer surface (coated by metal) so that if a polished wafer is used, a high quality mirror is easily formed. The mirror support structure is suspended above a cavity in the base by micromachined torsional springs. The mirror is separated from the base by etching away the wafer material from between the mirror support structure and the base. The mirror support structure is provided with a low mass stiffener, and the springs are provided with electrostatic deflection plates, so that the actuation force is applied directly to the springs.

In an alternative embodiment, magnetic actuation of the mirror assembly is provided. The mirror assembly includes a magnetic material thereon to provide a permanent or temporary magnetic moment. A magnetic actuator assembly is operative in conjunction with the magnetic material on the mirror to rotationally drive the mirror. The magnetic material can cover all or a portion of a surface of the mirror assembly. The magnetic material can be applied to a surface of the mirror assembly in a pattern preselected to improve the magnetic and mechanical performance of the system, such as to minimize moment of inertia and lowering of resonant frequency. Alternatively, the magnetic material can comprise a conduction coil formed on a surface of the mirror assembly, whereby a magnetic moment is formed when current is established within the conduction coil. The magnetic material can be formed along an edge of the mirror assembly, with an electromagnet disposed out of the plane of the mirror assembly.

The advantages of this invention over the prior art lie in the simplicity of manufacture, the size and performance of the mirror attainable in this design, and the accessible range of motion. The mirror can be made nearly as large as the starting wafer substrate (however, the sizes contemplated for the preferred embodiment are typically in the range of 50 $\mu$m×50 $\mu$m to 3 mm×3 mm).

The resonant frequency depends on the mirror size; for a 600 $\mu$m square mirror, resonant frequencies of over 20 kHz have been demonstrated, and with minor design changes, frequencies appropriate for scanning at frequencies above 30 kHz may be achieved. In one embodiment, the drive mechanism is electrostatic. However, several aspects of the invention lend themselves well to magnetic actuation. Because the mirror itself is supported over a cavity in the substrate, large angular displacement of the mirror and its supporting structure can be achieved while maintaining a small gap between the plates of the drive capacitor formed at the supporting springs. The fabrication of the mirror is relatively simple. The thickness of the mirror is easily controlled and may be adjusted to tune the resonant frequency or change the stiffness of the mirror. The surface of the mirror may be metallized for greater reflectance, or shaped to give it optical power.

In the process disclosed here, the mirror support structure is formed from the wafer substrate. The excess substrate material (if any) is first removed from the back of the mirror support structure by patterned etching, thus defining its thickness, mass, stiffness and thermal conductivity, while the mirror surface geometry is defined by patterned etching from the front. Using the substrate material to form the mirror support structure has many advantages. The wafers are in general available highly polished and extremely flat, giving good specular reflections (for example, Si and GaAs wafers intended for integrated circuit production are flat and specular). The reflectance of such wafers can be easily made to exceed 90% by metallizing the surface, for example with a thin layer of aluminum. Such a layer can be sufficiently thin (less than 0.5 $\mu$m) so as not to introduce undesirable topological features to the mirror surface. This is an advantage of the current invention over mirrors formed by surface micromachining, for example by electrodeposition of metal or CVD polysilicon, which are generally rough and so require a separate polishing step.

Silicon is a good choice for the substrate because the mechanical properties of single crystal silicon are nearly ideal for micro-mirror applications. Silicon is light, strong, and stiff, yielding rigid mirrors with low moments of inertia. The process disclosed here, applied to silicon, can yield a wide range of mirror thicknesses, and even allows for engineered structures that may be used for the construction of stiffer yet lighter mirror supports. The fabrication process for the current invention is relatively simple, requiring only a limited number of steps and mask levels. The springs in the current invention are conducting and serve as the top electrode, eliminating one fabrication layer. Finally, this invention uses an electrodeposited metal layer which makes possible magnetically actuated designs, by choosing a magnetic material (such as nickel or permalloy) for the metal.

Accordingly, the present invention relocates the driving force, either electric or magnetic, to sites that do not interfere to the same degree with mirror motion. Also, the present invention provides a suitably large mirror while maintaining a high resonant frequency (low mass), adequate stiffness, and adequate thermal conductivity. A mirror of this invention overcomes the problem of obtaining high mirror mass and structural rigidity, while also attaining the desired elastic constants in the springs. The mirror also overcomes the problem of attaining mirrors with the desired optical properties, including optical power.

DESCRIPTION OF THE DRAWINGS

The invention will be more fully understood from the following detailed description taken in conjunction with the accompanying drawings in which:

FIG. 14C is a schematic cross-sectional view of a torsional micro-mirror with a damping coating on the springs;

FIG. 14D is a schematic cross-sectional view of a torsional micro-mirror with high damping layers within the springs;

DETAILED DESCRIPTION OF THE INVENTION

Figure 1:
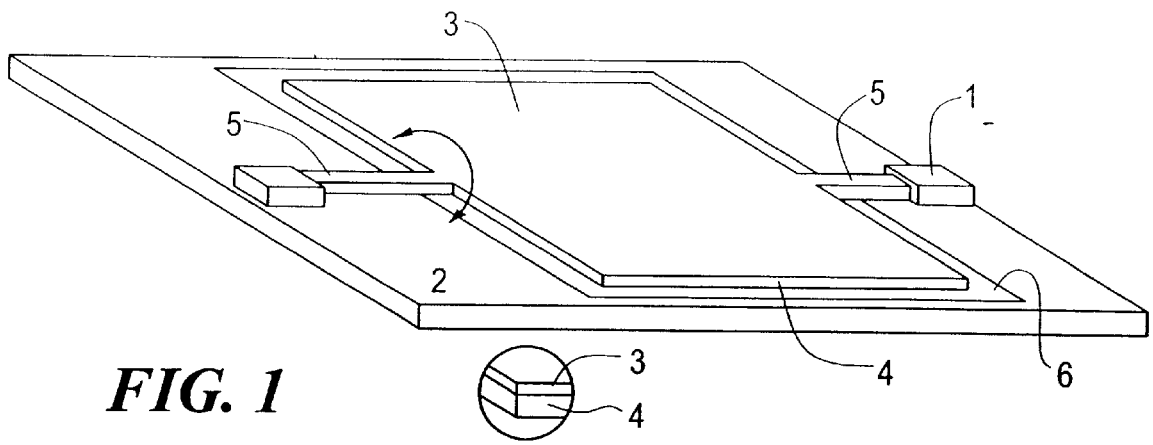
FIG. 1 is a perspective illustration of a torsional micro-mirror system of the present invention.

FIG. 1 shows a perspective illustration of a torsional micro-mirror system. Support posts 1 are mounted to a base 2. A mirror 3 and mirror support structure 4 are provided between the posts and are suspended by torsional springs 5. A cavity 6 formed in the base 2 below and around the mirror support structure 4 is provided to facilitate the rotation of the mirror. The deeper the cavity 6, the greater the rotation angle of the mirror. In some embodiments of the invention, the cavity extends entirely through the base so that the base does not limit the rotation at all. It should also be noted that although the mirror shown in FIG. 1 is rectangular, the mirror support structure and mirror surface may be any practical shape including round, ovoid, or octagonal, and may be selected to reduce the mass of the mirror support structure, while still yielding a satisfactory mirror area.

Figure 2A:
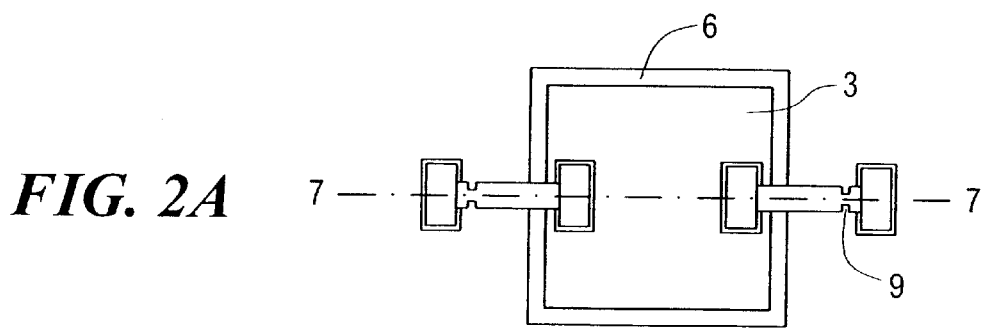
FIG. 2A is a plan view of a torsional micro-mirror system of the present invention.
Figure 2B:
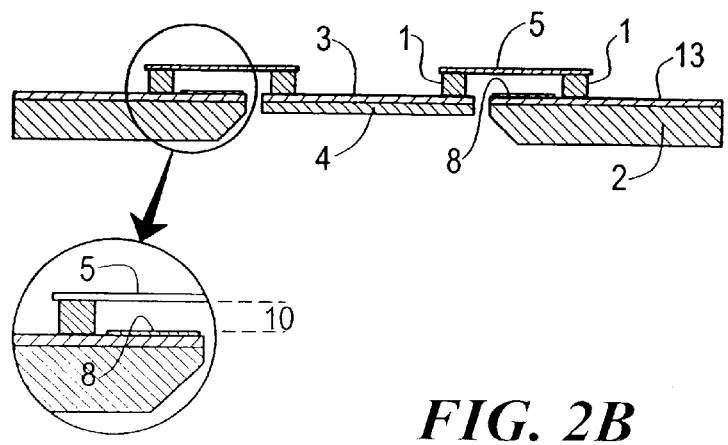
FIG. 2B is a cross-sectional view of the system of FIG. 2A taken along centerline 7.

FIG. 2A shows a plan view of one preferred embodiment, and FIG. 2B shows the cross section of the system shown in FIG. 2A, taken along centerline 7. The invention consists of a mirror surface 3, parallel in this case with the surface of base 2 and suspended above an opening 6 in the base by two torsional springs 5. The springs 5 are collinear and aligned with the mirror support structure 4 centerline 7, and are offset from the substrate and mirror surface by posts 1. The mirror surface 3 may be formed by vapor deposition of a metal such as Al onto mirror support structure 4. Metallized regions 8 on the base surface, under the spring 5 and offset laterally from the centerline 7 form one plate of the electrostatic drive capacitor, and the spring 5 serves as the other plate. Electrical contact to the drive capacitor plates is made by microfabricated conduction lines, and isolation between the conductors and the base is achieved by an oxide layer 13 formed on the surface of the substrate. The posts 1 offsetting the springs 5 from the substrate surface set the size of the capacitor gap.

Figure 3:
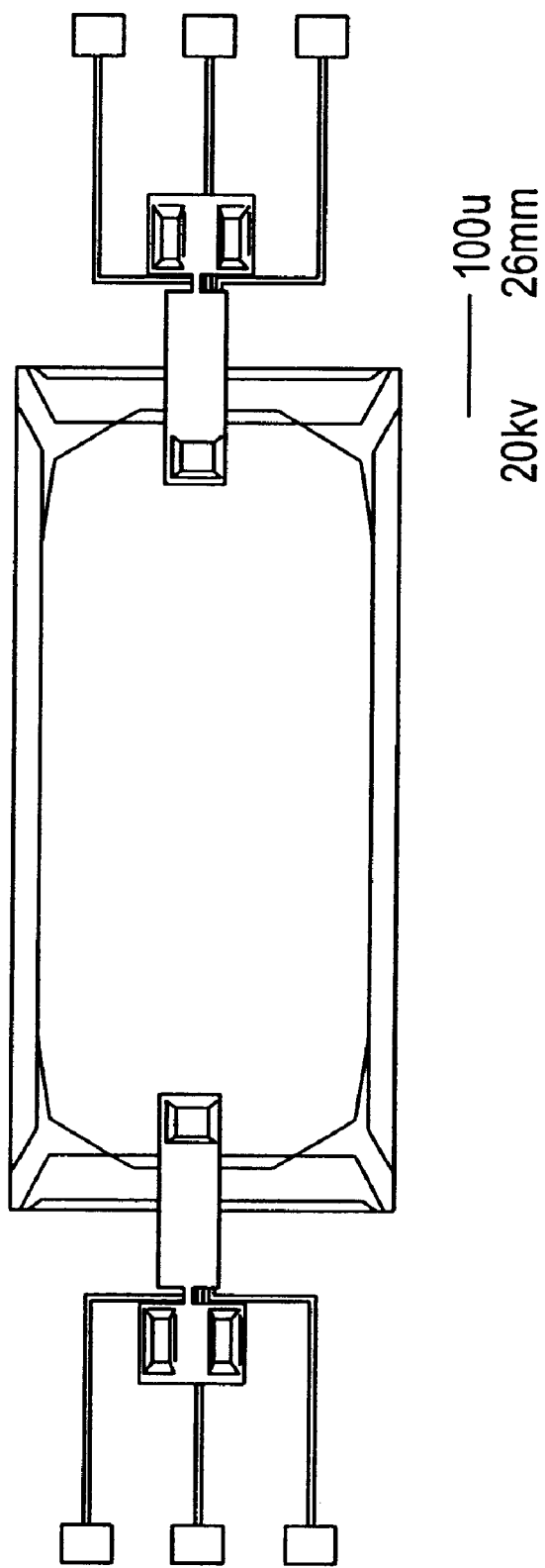
FIG. 3 is a scanning electron micrograph of a micro-mirror system of the present invention.

A preferred embodiment of the invention is designed to be operated at the resonance frequency of the device, which depends on the geometry and thickness of the mirror and the shape and material of the supports, as will be discussed later. In brief, necked down regions 9 reduce the spring constant of the springs 5 and reduce the driving force required for actuation. The reduced spring constant also reduces the resonant frequency. The extent of motion in response to a given drive voltage is determined by the stiffness of the springs 5, including necked down regions 9, and the size of the gap 10 between springs 5 and plates 8, the area of the plates 8, and the quality factor Q of the resonant structure. The maximum displacement is limited by the angle the torsional spring can twist through before the edge of the spring contacts the base. A plan view scanning electron micrograph of a mirror system formed in this way is shown in FIG. 3.

Figure 4A:
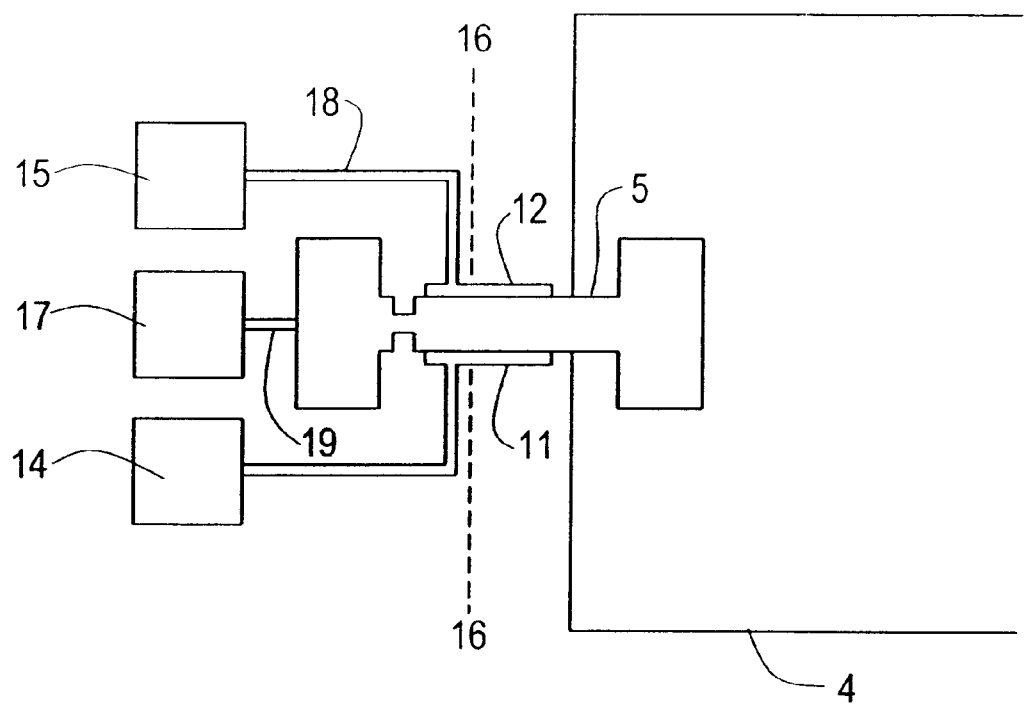
FIG. 4A illustrates a plan view of a further spring embodiment.
Figure 4B:
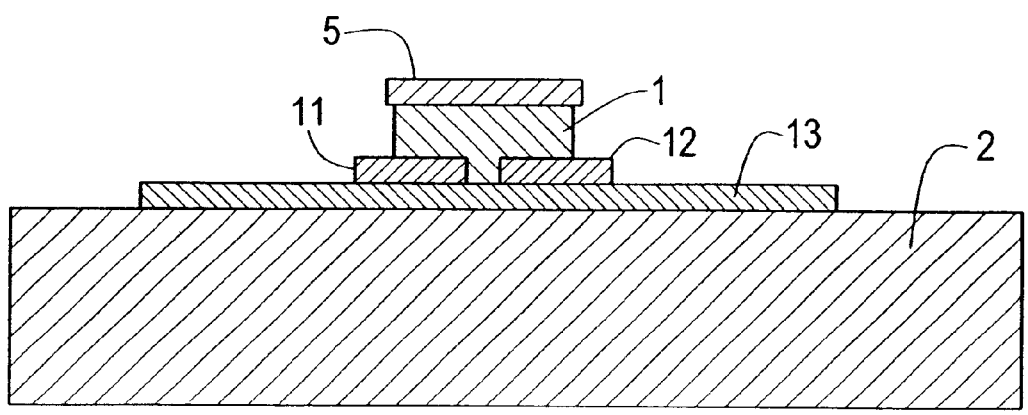
FIG. 4B is a cross-sectional side view of the spring embodiment of FIG. 4A.
Figure 5:
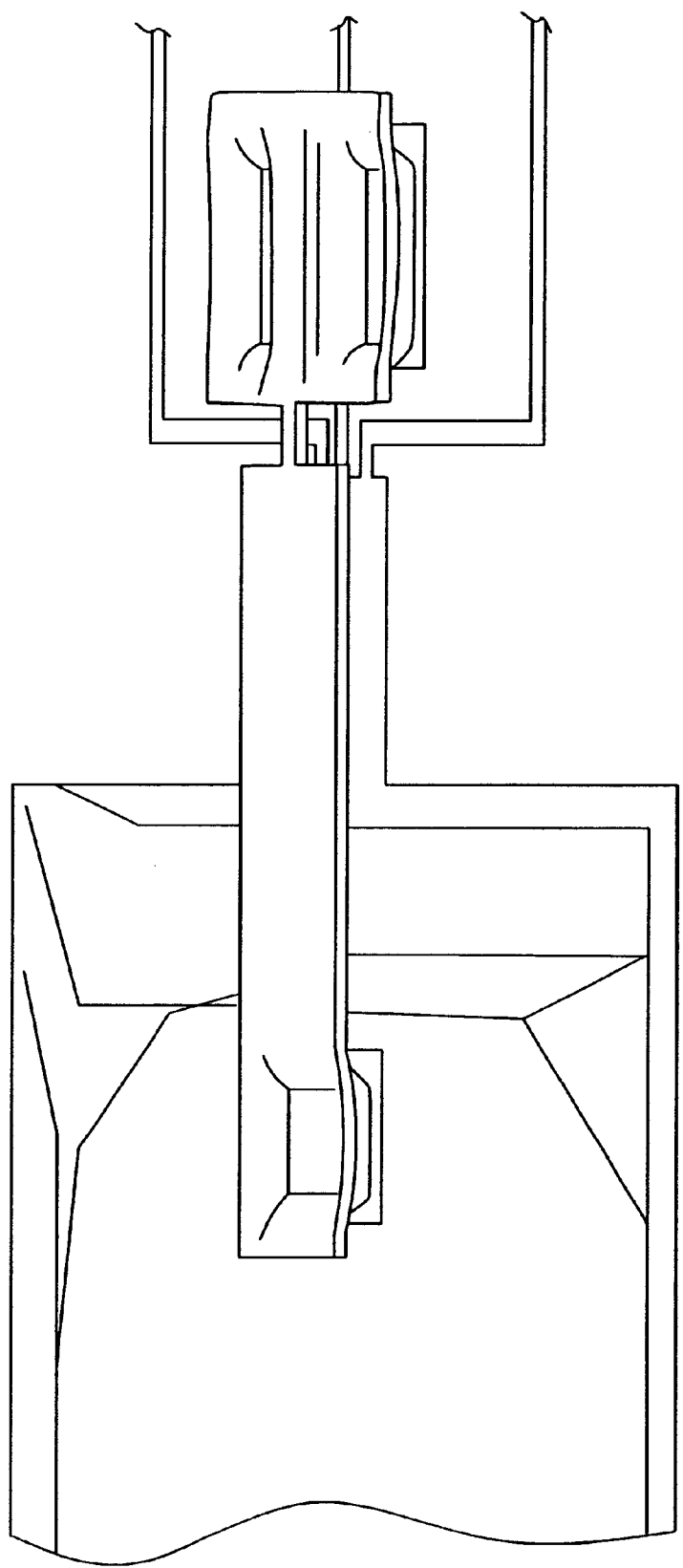
FIG. 5 is a scanning electron micrograph of a spring embodiment.

There are several key advantages of this invention over the prior art. First, this invention uses electrostatic actuation, applied to the springs 5. FIG. 4A and B illustrate one spring design, in which it can be seen that electrostatic force pads 11, 12, placed on an oxide 13 upon base 2 (not behind the mirror), are connected to pads 14 and 15. FIG. 4B shows a cross sectional view along line 16, and FIG. 5 shows a scanning electron micrograph of a spring system formed in this way. Spring 5, (metallic in this embodiment), is connected to pad 17. An electrostatic driving force can be applied between the spring 5 and the fixed force plate 12 by biasing pad 15 (in electrical contact with 12 through wire trace 18) with respect to pad 17 (in contact with spring 5 through trace 19), and similarly, a force can be applied between fixed force plate 11 and spring 5 by biasing pad 14 with respect to pad 17. Alternately biasing the pads with a periodic potential at or near the resonant frequency of the system will excite resonant motion of the mirror. Alternatively, the resonant motion may be excited by biasing only one plate and in such a case the other plate may be used for sensing the motion of the mirror by measuring the capacitance changes as the gap changes. For example, an AC bias may be applied between spring 5 and plate 11 at or near the resonant frequency to induce motion, and a DC bias voltage applied between plate 12 and spring 5. The changes in capacitance between spring 5 and plate 12 owing to the motion of the spring 5 may be sensed by monitoring the current at pad 12. On a given mirror support structure, one or both of the springs 5 may be biased and or sensed.

Note that in the embodiments shown herein the force pads are not behind the mirror, thus the mirror motion is not limited by the problem of the mirror contacting the force pad. The spring itself may contact the base, which will ultimately limit the range of motion of the mirror; however, the spring and force pads may be designed to yield a much greater range of motion, as we will show in the various preferred embodiments. Additionally, the fixed force plates 11, 12 may be designed so as to prevent electrical contact between the spring 5 and the fixed plates 11, 12, for example by coating the plates with a dielectric or by limiting the width of the plates so that the distance from the centerline to the plate edge is less than the product of one half the spring width and the cosine of the maximum deflection angle.

Figure 6A:
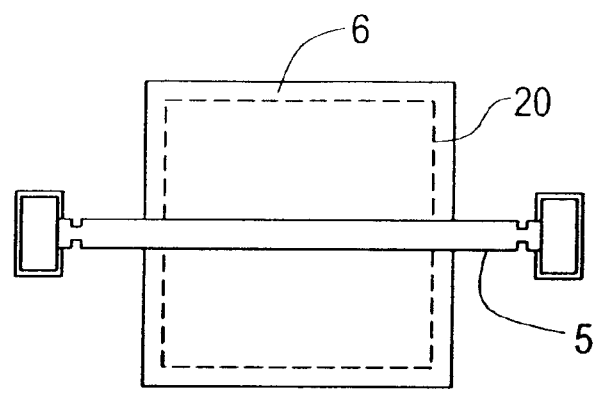
FIG. 6A is a plan view of a further embodiment of a torsional micro-mirror system of the present invention.
Figure 6B:
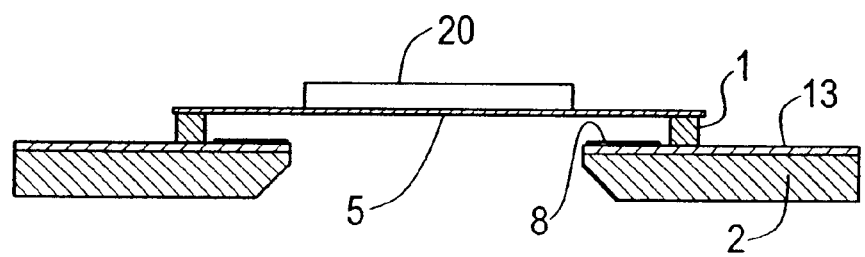
FIG. 6B is a side view of the system of FIG. 6A.

For certain applications, it may be desirable to modify the design by bonding external mirrors to the mirror support structure in a separate step. A mirror may be physically bonded to mirror support structure 4 (FIG. 2). In a different design (FIG. 6) the spring 5 also serves as the mirror support structure, and extends across the cavity 6. The mirror is bonded directly to this spring. These external mirrors 20 could be made of materials that are not convenient to include in the fabrication process, or could be made of mirrors having optical power. The approach shown in FIG. 6 has the additional and desirable feature that the cavity in the base wafer may be formed by etching only from the front side of the wafer.

Figure 7:
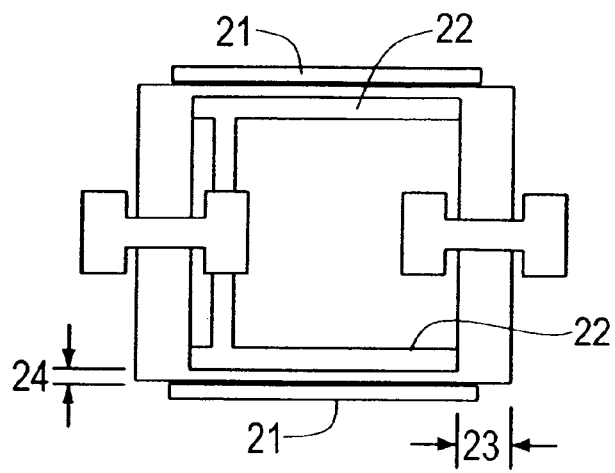
FIG. 7 is a plan view of a further embodiment of a torsional micro-mirror of the present invention.

Another embodiment of the invention uses a different electrostatic capacitor design for the drive, and is shown in FIG. 7. A pair of electrodes 21 is formed along the edges of the mirror parallel to the rotation axis. A second pair of electrodes 22 is formed on the base along the edges of the cavity nearest the mirror electrode. The force resulting from an applied voltage is proportional to the capacitance between the electrodes, which is inversely proportional to the gap between them. In this configuration no gap is required between the torsional springs 5 and the base 2, so the fabrication of the posts may be eliminated if desired. The length of the freely rotating portion of the springs 5 may be controlled by enlarging the width of the cavity 6 so as to increase the distance 23 between the mirror support structure 4 and the base 2. The distance 23 may differ from the distance 24 between electrodes 21 and 22.

Figure 8A:
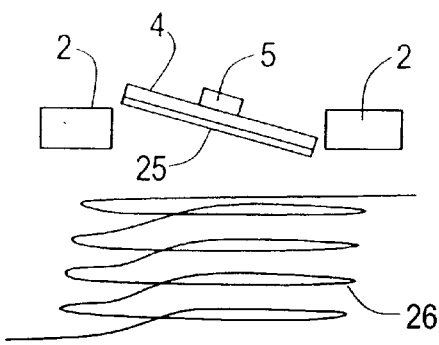
FIG. 8A is a schematic side view of an embodiment of a torsional micro-mirror system incorporating a magnetic actuation assembly.

A variation of the design involves magnetic actuation of the structure (FIGS. 8A though 8D), again without restricting the freedom of motion of the mirror. In this case, magnetic material 25 is applied to the mirror support structure (FIG. 8A) partially or totally covering the structure surface in order to give it a magnetic moment. The driving field is provided by an external electromagnet 26 which exerts a torque on the magnetic structure, causing the mirror support to rotate.

The electromagnet may be placed at a sufficient distance from the mirror to allow free rotation. However, if only limited motion is required, the magnetic coil may be placed closer to the mirror, thus reducing the coil current necessary to achieve actuation.

Figure 8B:
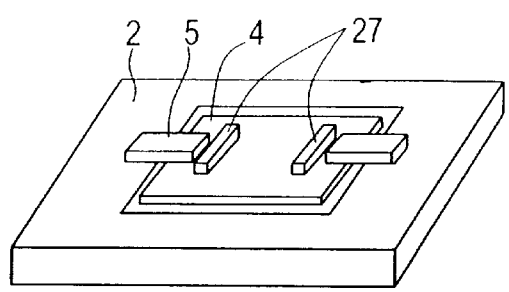
FIG. 8B is a schematic isometric view of a further embodiment of a magnetically actuated system.

The magnetic material may be patterned to improve the magnetic and mechanical performance of the device. Specifically (FIG. 8B) the material may be confined near the axis of rotation so as to minimize its moment of inertia and avoid lowering the resonant frequency, and may be shaped into one or several elongated structures 27 so that the preferred magnetic axis is perpendicular to the rotation axis.

The magnetic material may either have a permanent magnetic moment or temporarily acquire a moment upon the establishment of an external magnetic field, in which case the torque is due to the shape anisotropy of the magnetic structure. The electrodeposited layer comprising the springs may be chosen to be of a magnetic material, for example (but not necessarily) permalloy, in which case the magnetic structure may be formed in the same operation as the fabrication of the springs, or incorporated into the design of the springs themselves. Alternatively, two different materials may be used for the springs and magnetic structures, which may be formed in separate steps. Alternately, the magnetic material may be separately deposited or laminated onto the structure, in which case the magnetic material need not be formed by or even be compatible with standard fabrication processes, allowing the use of, for example, ceramic ferromagnets.

Figure 8C:
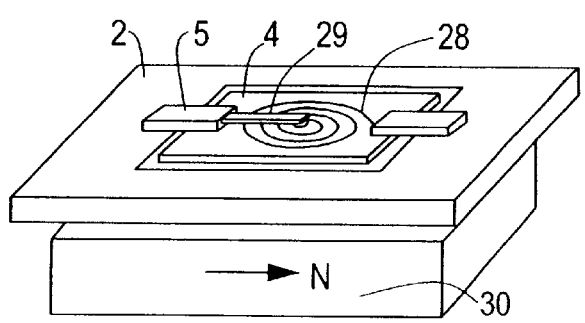
FIG. 8C is a schematic isometric view of a further embodiment of a magnetically actuated system.

Another approach comprises patterning of a conduction coil 28 (FIG. 8C) onto the mirror support structure, which creates a magnetic moment when current is established. If multiple turns are used, a bridging structure 29 may be fabricated to connect the center of the coil to the electric leads. The magnetic moment established when current flows in the coil interacts with the field of a small permanent magnet 30 to rotate the mirror support structure to the desired angle.

Figure 8D:
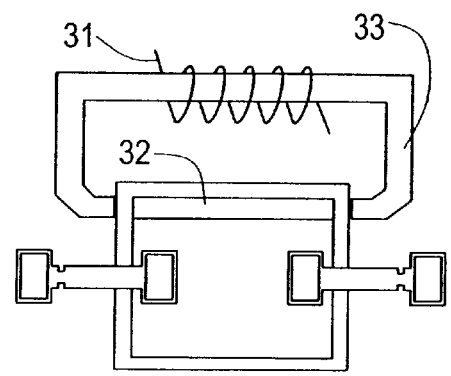
FIG. 8D is a schematic plan view of a further embodiment of a magnetically actuated system.

Yet another approach to magnetic actuation uses a reluctance circuit approach (FIG. 8D). One or more external electromagnets 31 are mounted either slightly displaced above the mirror structure or at an angle to it. Upon the establishment of a current in the coil, the magnetic material 32 is pulled towards the center of the coil, forming part of the electromagnet core. In this case, additional magnetic material 33 may be deposited on the base 2 for the attachment of the external coils 31 and used to define the shape of the applied magnetic field. The electromagnet may be fabricated on the wafer using standard techniques.

Figure 8E:
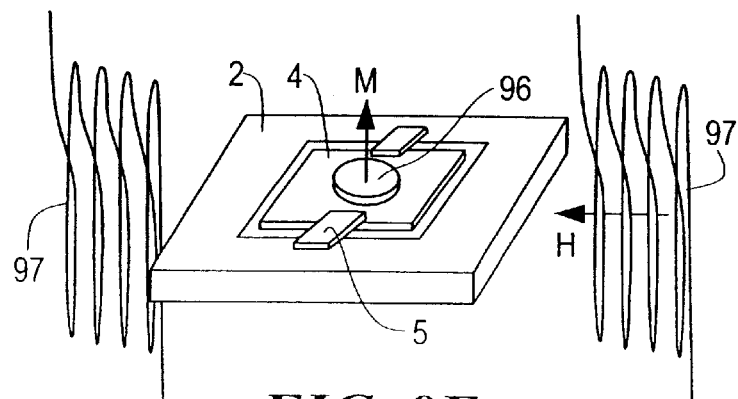
FIG. 8E is a schematic isometric view of a further embodiment of a magnetically actuated system.

A fifth approach to magnetic actuation uses a permanent magnet attached to the mirror structure to provide a magnetic moment normal to the mirror surface. See FIG. 8E. In this configuration a magnetic field applied parallel to the mirror surface and orthogonal to the axis of rotation exerts a torque on the permanent magnet causing the mirror to rotate. The field could be produced, for example, by a pair of electromagnet coils placed on either side of the mirror along an axis orthogonal to the rotation axis, with the coil axis parallel to the surface of the mirror.

Figure 9:
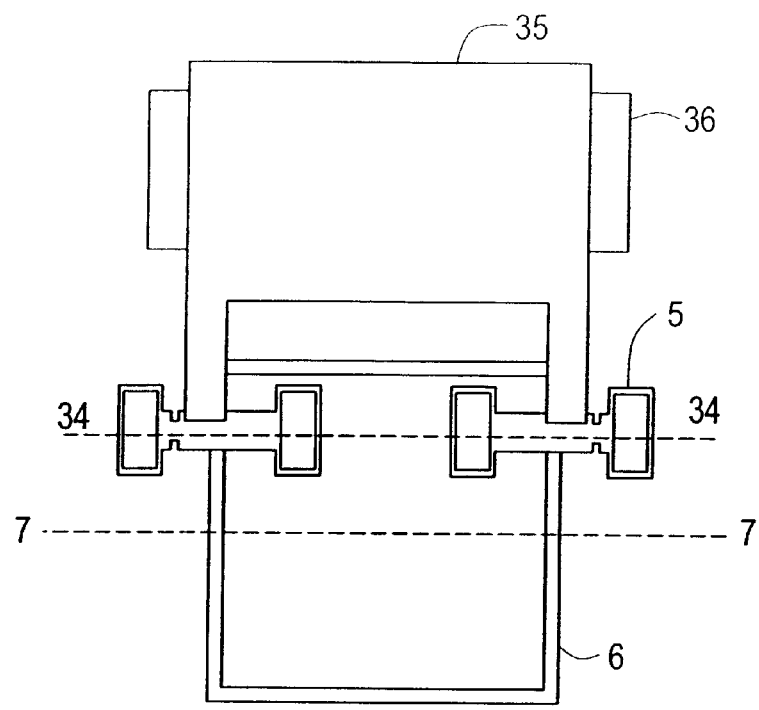
FIG. 9 is a schematic plan view of a further embodiment of an actuator assembly for a torsional micro-mirror system of the present invention.
Figure 10A:
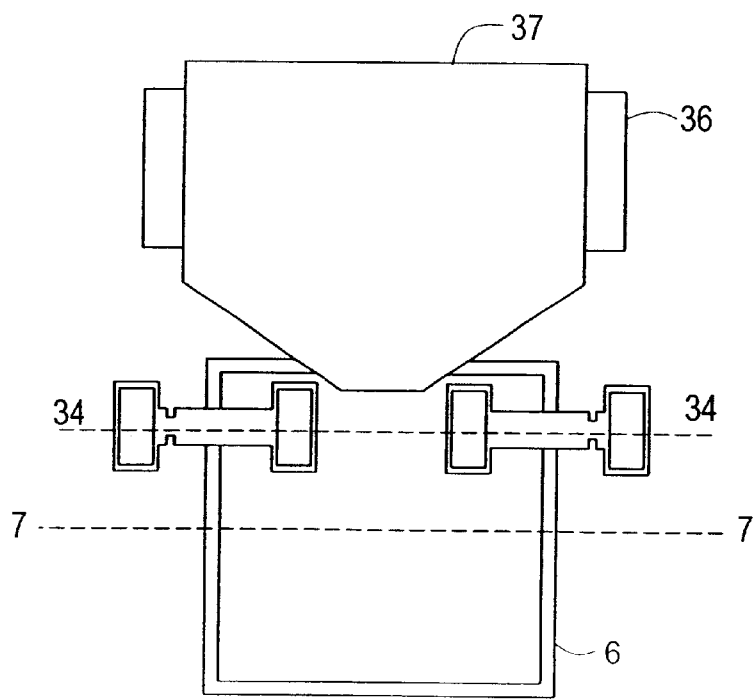
FIG. 10A is a schematic plan view of a further actuator assembly.
Figure 10B:
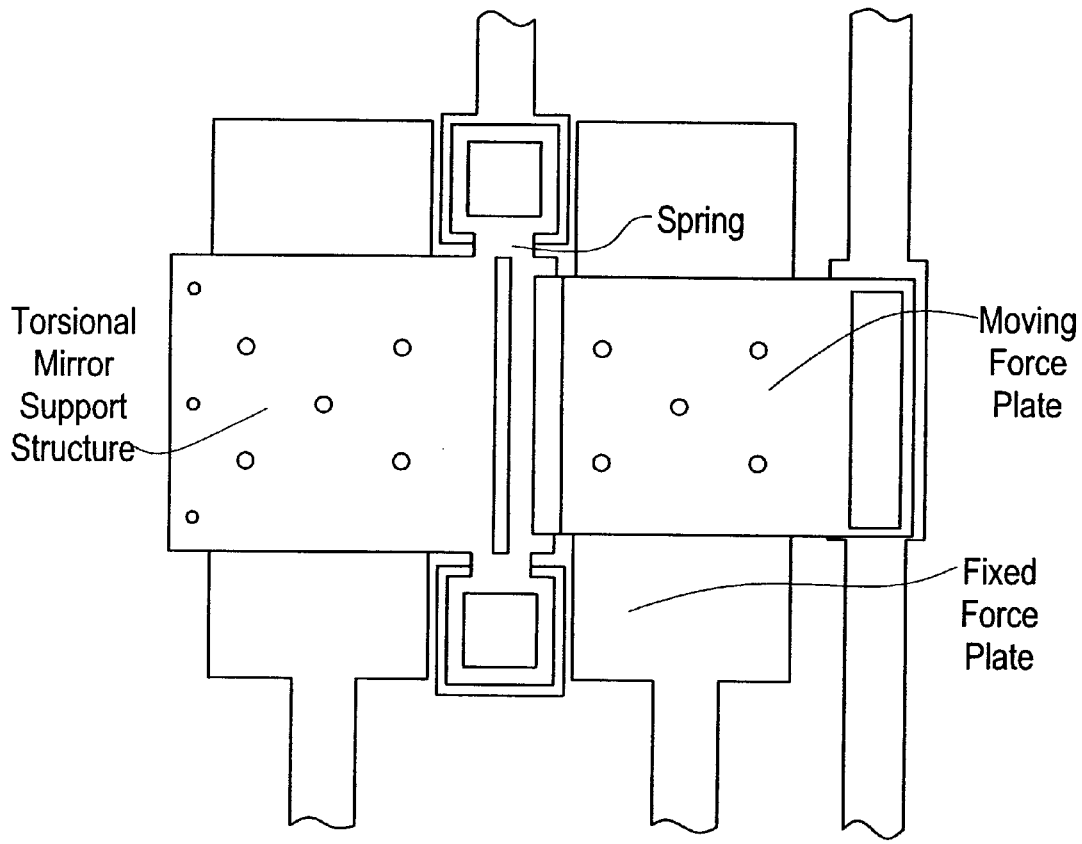
FIG. 10B is an image of a torsional micro-mirror such as that in FIG. 10.

Yet another embodiment of the invention suspends the mirror about an axis of rotation 34 displaced from its centerline 7, as shown in FIG. 9, allowing greater linear displacement on one side of the axis of rotation than the other. In this embodiment a large movable capacitor plate 35 is arranged to push on the springs 5. The large fixed plate 36 is biased with respect to plate 35, thereby generating a large force which is transferred to the springs. The force of plate 35 may also be transferred directly to the mirror by an arm 37 as shown in FIG. 10A, which may or may not be attached to the mirror. The drive of the mechanical actuator may be electrostatic, magnetic, or piezoelectric. An image of a scanning electron micrograph of such a device is shown in FIG. 10B.

Figure 11:
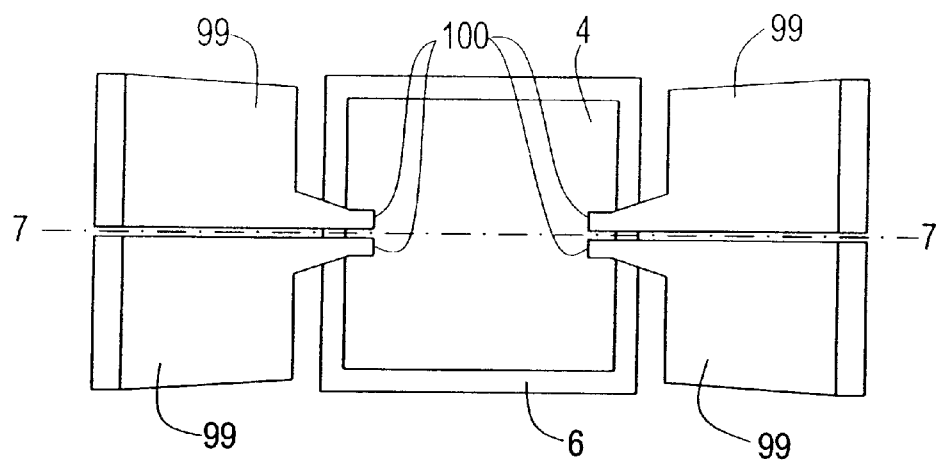
FIG. 11 is a plan view of a further embodiment incorporating cantilevered springs to actuate torsional motion.

Alternatively, one or both springs may be split into two elements 99 along the axis of rotation 7 (FIG. 11) in order to provide additional electrical paths onto the mirror support assembly. In this embodiment, rotational compliance of the springs may be replaced by bending or twisting of the support posts 100 at the mirror support platform. This has the further advantage that the rotational motion of the mirror support platform can result from cantilevered bending of the springs. At the fixed base end, the springs may be made as wide as desired to increase the electrostatic force. Applying a voltage between the springs and the capacitor plates on the fixed base, alternately on each side of the centerline 7, causes the springs to bend and push down on the support platform. By attaching the springs to the platform near the axis of rotation, large angular displacement can be achieved for very small vertical motion. This embodiment improves on a device such as described by Dhuler in several important aspects. First no bearing or additional element is required for supporting the moving platform, simplifying the fabrication and eliminating wear associated with surfaces moving against each other. Second, the springs and supports described in this invention may serve as electrical paths onto the mirror support platform.

Video images require sweeping in two orthogonal directions, but the second sweep direction need not move faster than the frame rate, ranging from 30–180 Hz. To obtain images, two separate mirrors could be used, rotating about orthogonal axes, or a single reflecting surface could be made to scan both directions. A single mirror that scans two orthogonal directions is achieved either by mounting the current invention on a scanning platform, or modifying the design so the reflecting surface is supported within a gimballed frame, and made to scan in both directions. The actuating mechanism for the two directions could be direct or indirect electric or magnetic force, or any combination thereof.

Figure 12:
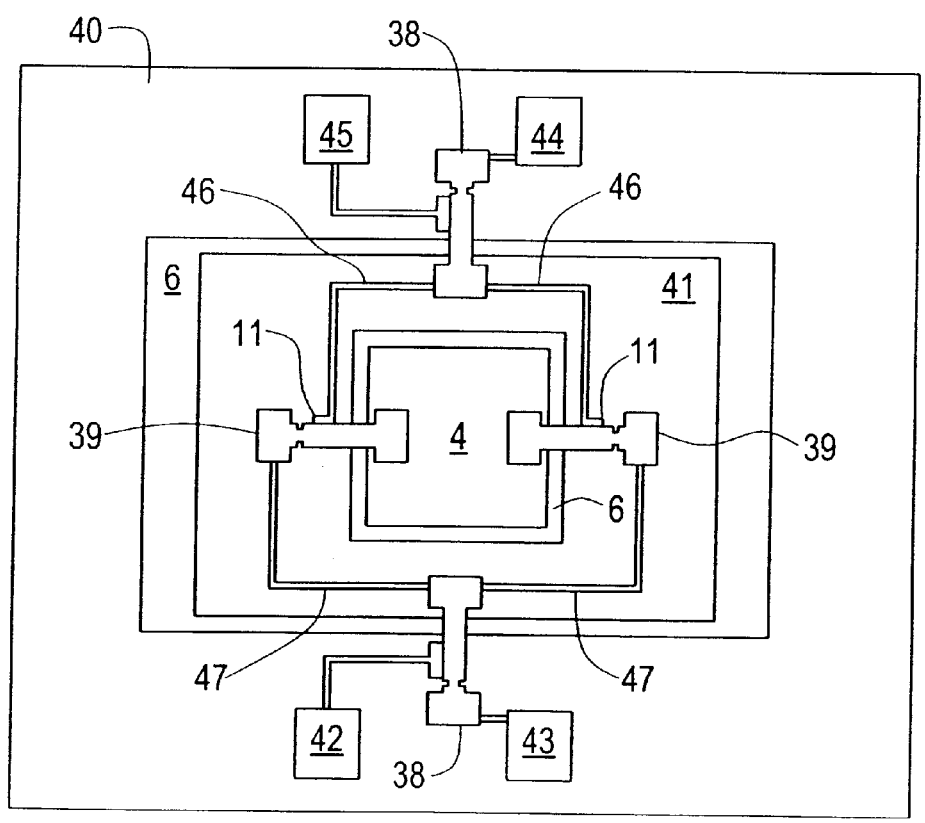
FIG. 12 is a schematic plan view of a multi-axis torsional micro-mirror according to the present invention.

A multi-axial micro-mirror may be formed using the designs and processes described herein. The actuation mechanism for the two directions is direct or indirect electric or magnetic force, or any combination thereof. FIG. 12 illustrates one possible multi-axial design: a first pair of springs 38 is used for rotation of the mirror support structure 4 along one axis, and a second pair of springs 39 is used for rotation along a second axis which in this case is perpendicular to the first axis. The first pair 38 joins the base 40 to a movable support frame 41; this support frame 41 is connected to the mirror support structure 4 by the second pair 39. (Other pairs and additional movable supports may be added that can be designed to operate at resonance or in a bi-stable mode with the advantage of providing aiming or alignment of the micro-mirror system. Other pairs may also be useful in distortion correction.) The deflection voltage is supplied to the pair 38 through bias applied to pads 42 and 43, and through bias applied through pads 44 and 45. The deflection voltage for pair 39 is supplied through pair 38 by traces 46 and 47. Thus, by relatively biasing the two springs in pair 38, bias to the pair 39 may be attained, without addition of further conduction paths to the moving parts.

Figure 13A:
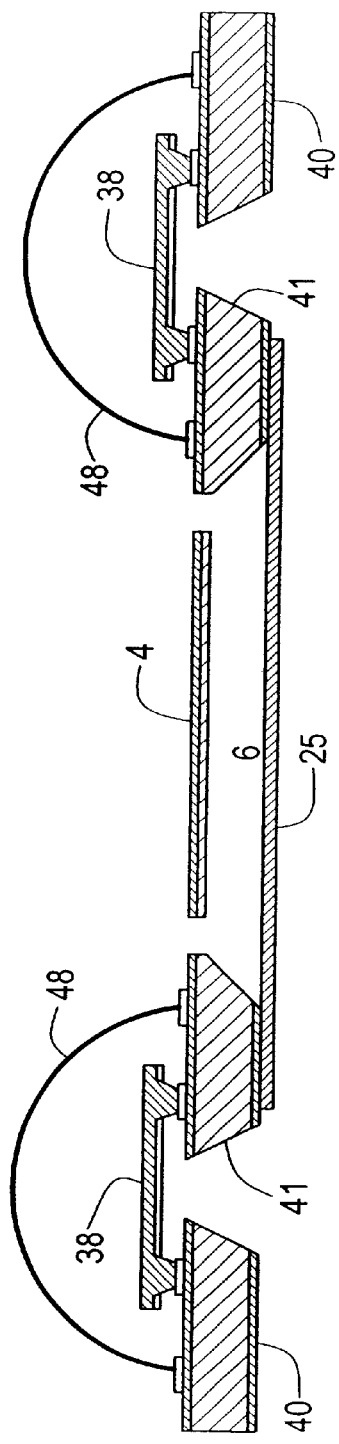
FIG. 13A is a schematic cross-sectional view of a further embodiment of a multi-axis torsional micro-mirror having wire-bond wire jumpers according to the present invention.
Figure 13C:
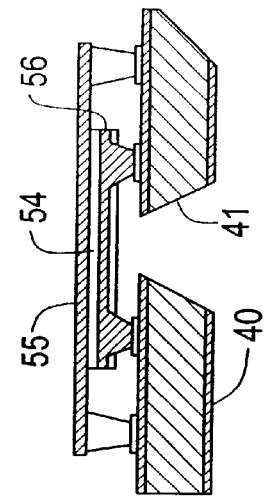
FIG. 13C is a schematic view of a multi-layered torsional spring containing multiple electrical paths to the mirror.
Figure 13B:
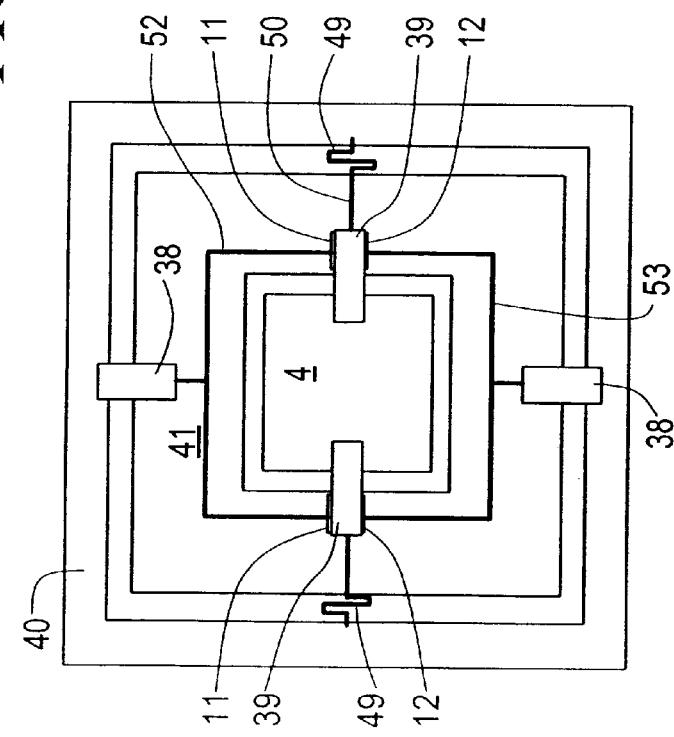
FIG. 13B is a schematic plan view of a multi-axis micro-mirror of FIG. 13A having integrally fabricated contact structures.

If separate electrical contacts are to be provided for the inner mirror of a gimballed structure, they may be combined with the mechanical support of the outer mirror support frame, or may be run through separate structures bridging the gap between the inner and outer support structures, as shown in FIG. 13. These separate structures may or may not contribute to the mechanical properties of the system. The structures may either be added as part of the packaging process, such as the addition of wire-bond wire jumpers 48 in FIG. 13A, or may be fabricated along with the rest of the structure. An example of integrally fabricated contact structures which minimally impact the mechanical properties is shown in FIG. 13B. Soft serpentine springs 49 bridge the gap, and connect through traces 50 to the inner springs 39. The outer springs 38 are separately connected to the drive pads 11 and 12 by traces 52 and 53 respectively. Multilayered spring supports may also be used to increase the number of separate electrical paths to the inner mirror. FIG. 13C shows such a spring; an insulating layer 54 separates the upper conducting layer 55 from the lower conducting layer 56. Each conducting layer connects to a separate pair of traces (not shown).

Figure 14A:
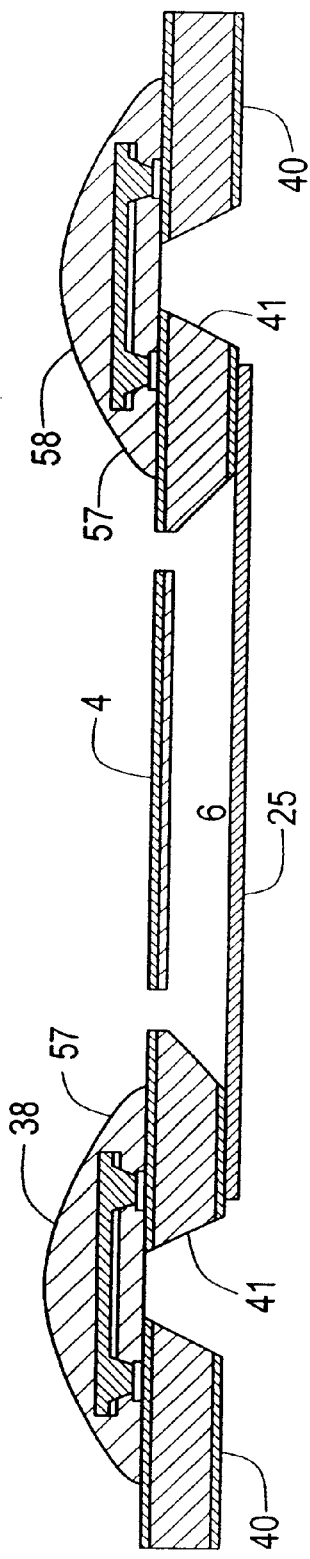
FIG. 14A is a schematic cross-sectional view of a torsional micro-mirror incorporating a damping material surrounding the springs.
Figure 14B:
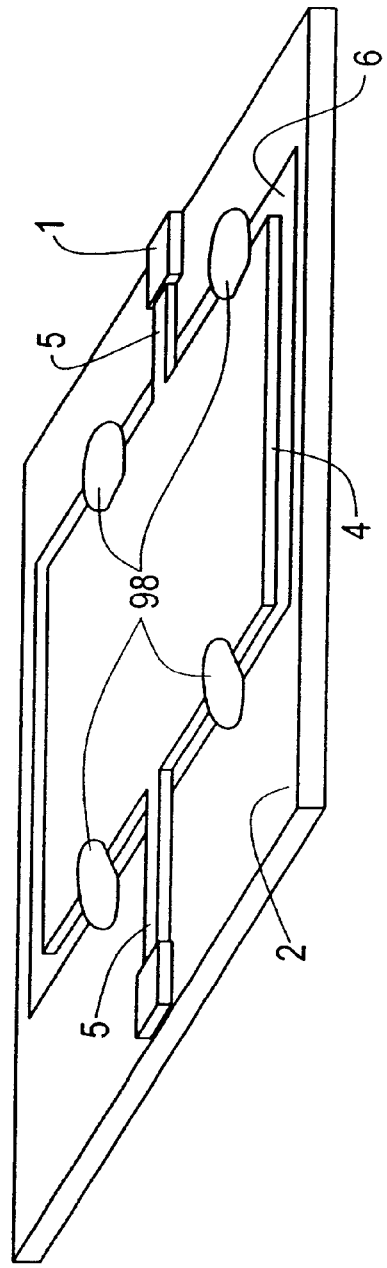
FIG. 14B is a schematic isometric view of a torsional micro-mirror incorporating damping material at several positions along the moving edge of the mirror.

It may be desirable for the inner and outer support structures to have different damping characteristics. For example, in a scanning display, the line scanning structure may be resonantly driven and benefit by low damping (high Q), while the frame scanning structure is driven linearly at low frequency and benefits from high damping for uniform motion. Thus, the device can be operated in a vacuum package to minimize the air damping of the fast mirror, with specific damping means provided for the slow scanning structure. For example, a damping material 57 may be applied to the slow moving structure or the springs (FIG. 14A). This damping material may consist of a liquid, gel, or soft semi-solid surrounding the springs, with or without an enclosure to confine it. Many materials are suitable for this purpose, including vacuum grease such as Dow Corning DC 976 or Apiezon N type, RTV silicone, or spin-on polymers used in the fabrication process such as polyimide or photoresist (for example Shipley AZ1308). One embodiment is the application of a drop of DC 976 57 to the substrate so that it encloses the springs (FIG. 14A). Optionally, the damping material 98 may instead be applied along the moving edge away from the spring (FIG. 14B), so that it bridges the gap between the moving support element and the fixed base of the device. The damping material may be applied anywhere along the gap between the moving component and the fixed component, or between two components moving at different velocities, for example, the mirror platform and the gimballed outer frame of a biaxial embodiment. An alternative is to coat the springs 38 with a high damping coating such as photoresist 58 (FIG. 14C). Another alternative is to enclose a high damping material within the springs, for example by making a multilayer structure incorporating high strength layers 59 surrounding high damping layers 60. Damping may also be provided by mechanically attaching damping devices (dashpots) between the moving structure and the base.

Figure 15A:
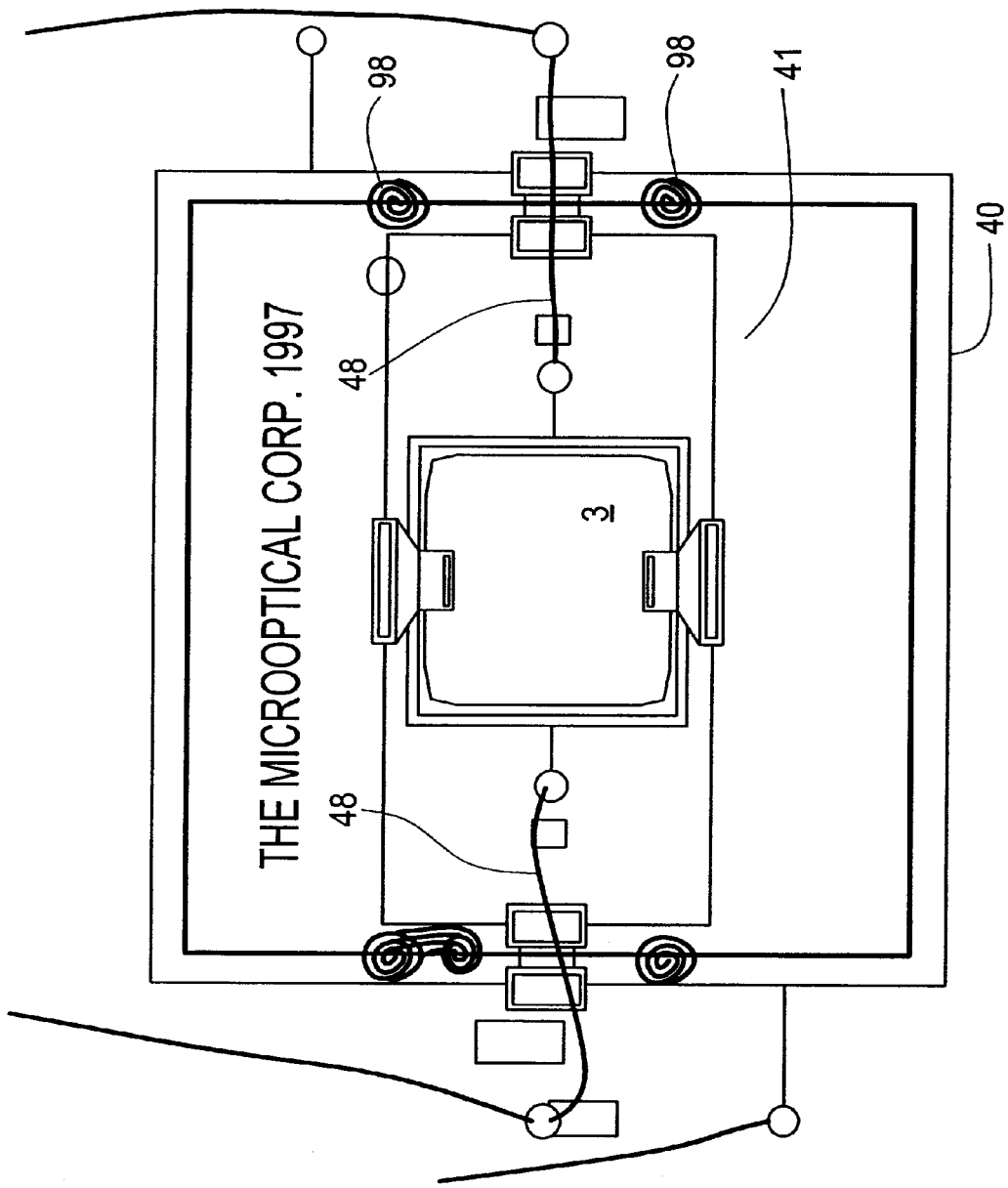
FIG. 15A is an image of a biaxial micro-mirror with wire-bond wire jumpers and damping with vacuum grease.
Figure 15B:
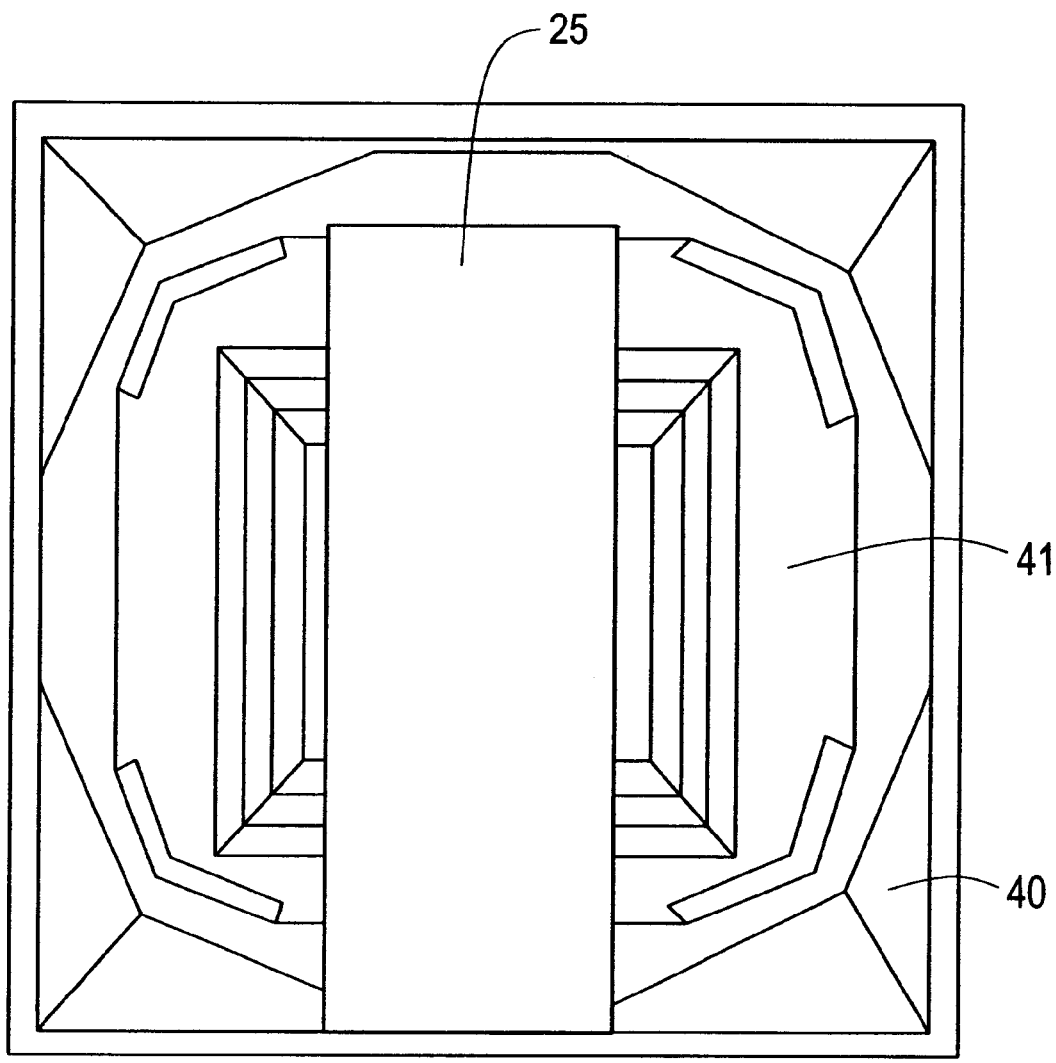
FIG. 15B is an image of the biaxial micro-mirror of FIG. 15A illustrating a magnetic foil laminated to the back to provide a magnetic moment.

FIG. 15A is a micrograph image of a biaxial scanning display device. The inner mirror support platform 4 is the line scanner, driven by an electrostatic resonant drive. The oxide has been removed from its surface and it has been coated with aluminum to form the mirror reflective surface. The electrical ground lead contact is made through the outer frame supports 38 and the drive voltage contacts are made by wire-bond wire jumpers 48. The outer frame is the frame scanning direction and is driven magnetically to give a slow linear sweep and a fast retrace. Harmonic oscillations in the motion are damped by the application of approximately 0.005 microliters of DC 976 vacuum grease 57 to dampen the slow axis springs 38. The magnetic moment is provided by magnetic foil 25 laminated to the back of the structure, covering half the area and placed orthogonal to the axis of rotation (FIG. 15B). This device is then mounted on a small electromagnet and packaged in vacuum.

In a preferred embodiment of a device as shown in FIG. 15, the mirror support platform is approximately 1 mm×1 mm and has a resonant frequency ranging from 7 to 15 kHz. The resonant frequency of the outer frame is 150 to 700 Hz. The outer frame is driven at 60 Hz. The device is packaged in vacuum above an electromagnetic coil, preferably in a T05 package containing optics.

Figure 16:
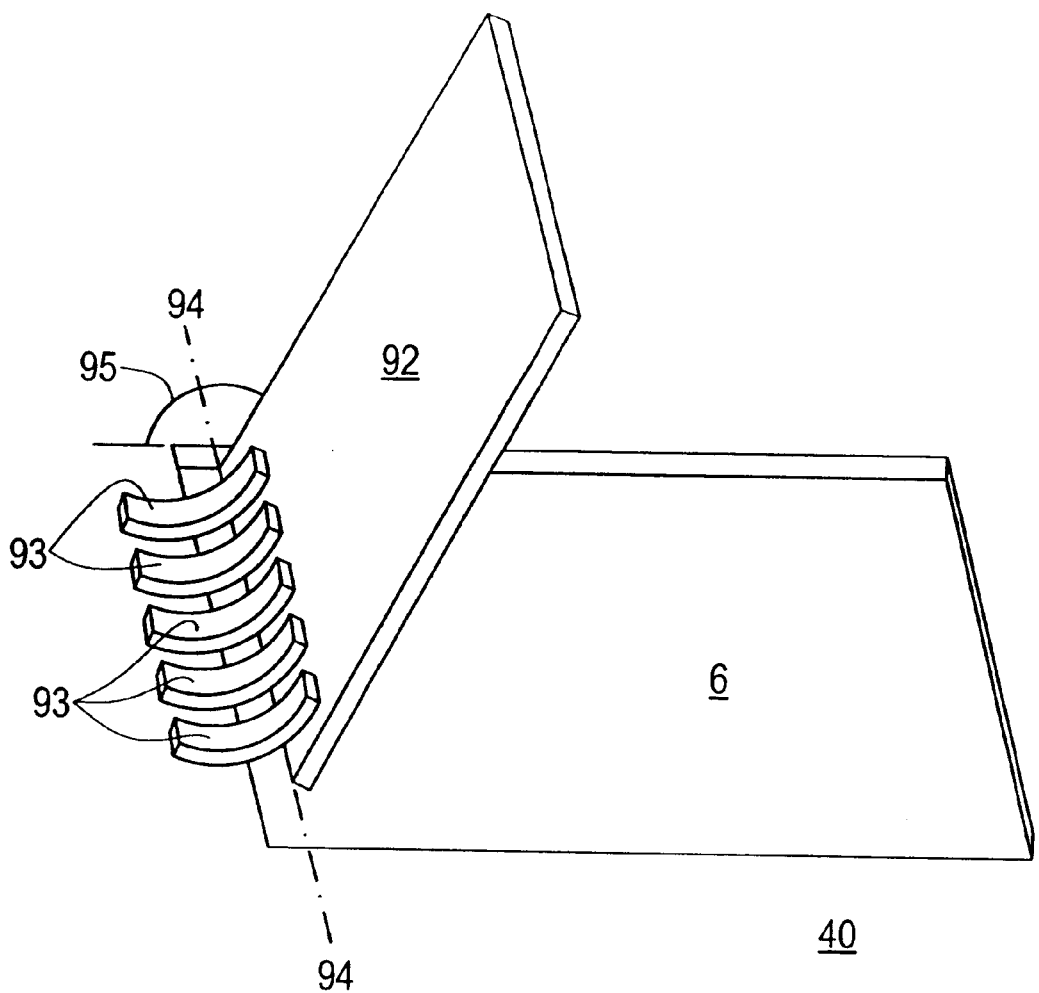
FIG. 16 is a schematic isometric view of a cantilevered micro-mirror according to the present invention.

In another embodiment of the invention, shown in FIG. 16, the mirror support structure 92 is connected to the base 40 along one edge 94 by one or several metal cantilever springs 93, allowing the mirror support structure to rotate out of the plane of the wafer. The stiffness of the support springs 93 depends on the total aggregate width, but this width may be distributed among as many supports as desired (five in FIG. 16), each providing a separate electrical path onto the mirror support structure. Other devices, for example a torsional MEMS mirror such as described herein, a CMOS circuit, for example the drive circuit, or both, may be fabricated on or grafted onto the platform 92. The number of possible electrical contacts is limited only by the length of the edge 94 and the minimum practical width and separation of the springs 93. This embodiment is an improvement to the mirror disclosed in the literature by Miller, in that the support springs are conducting and may provide multiple distinct electrical contacts to elements on the mirror support platform. In addition, the platform in the present invention may be formed of the original wafer, which may be a single crystal semiconductor, and may have a desired thickness up to the full thickness of the original wafer. Thus, it may comprise any desired CMOS circuit or device, which may be fabricated on the substrate prior to the release of the cantilevered platform.

The motion of the platform 92 may be used either to set the angle 95 between the platform 92 (and any devices carried upon it) and the base 40 (and any other devices attached to it), for example for the purpose of optical alignment, or to sweep the angle, for example for a display. The cantilever may be moved into place mechanically, for example during the fabrication or packaging of the device, and locked into place, to fix the angle. Alternatively, magnetic material may be applied to the front, back, or both surfaces of the platform and a magnetic field may be applied to it during operation to rotate it to the desired angle. In this case, a DC magnetic field bias may be applied to set the center angle of motion, and an AC field superimposed on it to sweep the angle. Either the AC or DC component may be zero. In another variation, mechanical elements such as levers may be provided to set the angle during operation.

Figure 17:
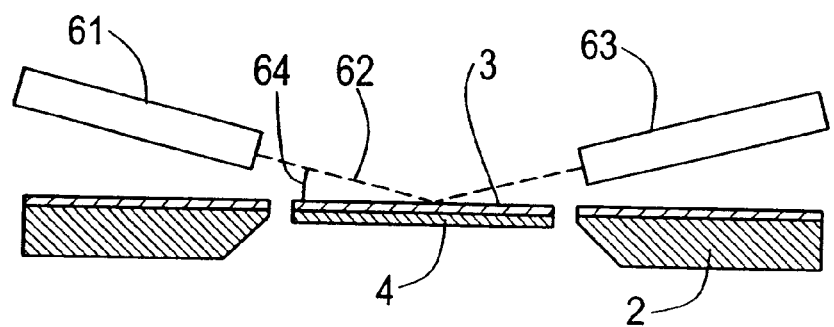
FIG. 17 is schematic cross-sectional view of a micro-mirror incorporating optical sensing.

Sensors may be added to the mirror to detect its position and the extent of the motion and provide feedback for the drive electronics. One sensor design consists of capacitors similar to but separate from the drive pads, with detection of the current changing as a function of mirror position as previously described. If magnetic material is present on the moving structure, a magnetic sensor, for example a pickup coil, may be placed in close proximity to detect the mirror position. Optical sensing may also be utilized, as shown in FIG. 17. A light source 61 provides a focused beam 62 which is reflected off the mirror 3 and detected by a detector 63. As the mirror rotates, the intensity of light incident on the detector 63 changes and can be correlated with mirror angle. The angle of incidence 64 can be chosen so the sensing light does not interfere with the display illumination, or an infrared source may be used. Alternatively, the detection may be made from the back of the mirror structure by reflecting the light off the back of the mirror support structure 4. Optionally, the mirror position may be determined by sensing the light incident on it for display illumination. Detection may also be made by allowing invisible radiation such as infrared light to pass through a specifically designed mirror surface coating to a detector mounted on the back of or underneath the device.

Support and Spring Design

For electrostatic actuation, the force is proportional to the square of the applied voltage and inversely proportional to the square of the gap 12 (FIG. 2) between the drive capacitor plates. Making the gap smaller or the spring wider reduces the maximum angle of rotation but increases the applied torque, while making the gap 12 larger or the support narrower allows greater motion but reduces the torque resulting from a given applied voltage. At the maximum displacement, at least some portion of the spring 5 touches the base 2. The present invention is designed so that the mirror itself is free to rotate to any degree within the elastic limits of the springs, and the displacement is limited by the rotation of the springs in relation to the base. For a fixed gap height g, if at any given point z along the length of the spring its width is w(z), then the maximum rotation allowed at that point is approximately $$\sin(\phi)=2g/w(z).$$

The angle of rotation varies along the length of the spring, from approximately zero at the connection to the support post to the maximum at the mirror support structure, and the spring shape can be designed to take advantage of this, for example by making the spring wider near the fixed end and narrower at the mirror support structure, allowing a greater angle of rotation while still allowing for a large plate area and thus allowing for application of a larger torque than would be obtained in a spring of uniform cross section.

Figure 18A:
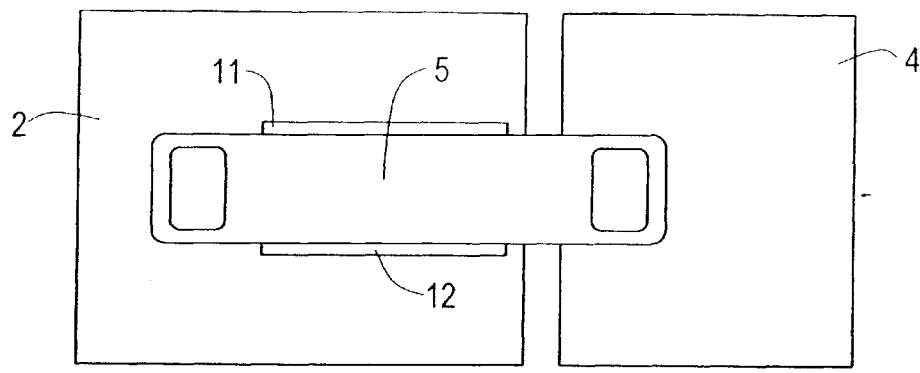
FIG. 18A is a schematic plan view of a torsional spring

Several possible spring designs are shown in FIG. 18. The stiffness of each design can be calculated from standard mechanical expressions, for example as found in Mark's Handbook of Mechanical Engineering. T. Baumeister, editor in chief, Mark's *Standard Handbook for Mechanical Engineers*, 8th ed., McGraw-Hill Book Company, New York, 1978, Section 5. For the uniform cross section spring shown in FIG. 18A the torsional stiffness $K_t$ is given by $$K_t = \frac{G}{3.5l}\left(\frac{b^3 h^3}{b^2 + h^2}\right) \quad 1$$

where G is the shear modulus, l, b, and h are the length, width, and depth of the member respectively, and the numerical constant depends on the aspect ratio of the cross section. For non-uniform cross section springs, the reciprocals of the stiffness of individual elements add to give the reciprocal total stiffness:

$$K_{total}^{-1} = \sum_i K_i^{-1}. \quad 2$$

Figure 18B:
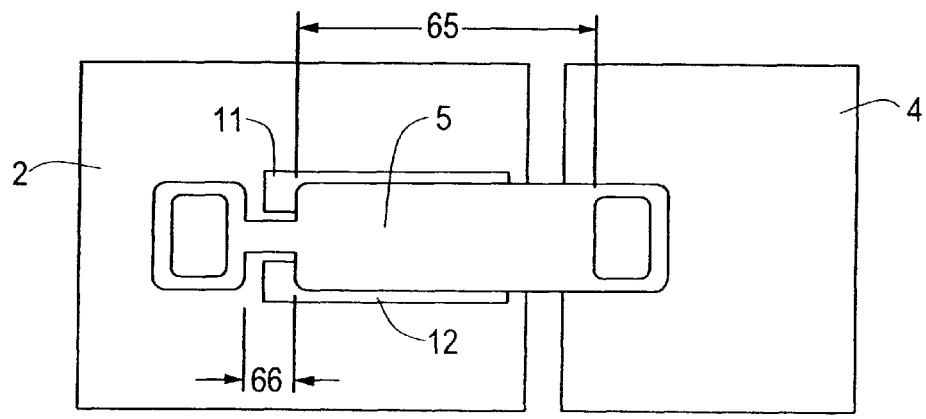
FIG. 18B is a schematic plan view of a further embodiment of a torsional spring.
Figure 18C:
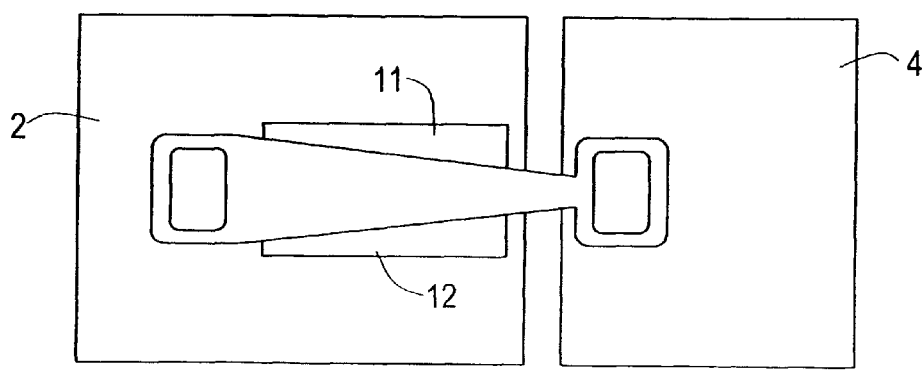
FIG. 18C is a schematic plan view of a further embodiment of a torsional spring.

For example, introducing a necked down region, as in FIG. 18B, reduces the stiffness to:

$$K_{total} = \frac{K_1 K_2}{K_1 + K_2}, \quad 3$$

where $$K_t = \frac{G}{3.5l_i}\left(\frac{b_i^3 h^3}{b_i^2 + h^2}\right), \quad 4$$

since the wide part 65 of the spring 5 and the necked down part 66 of the spring 5 have different lengths and widths, but the thickness of the electrodeposited layer and the material properties are the same for both. This type of design makes the device easier to actuate, but also reduces its resonance frequency. For a tapered support as shown in FIG. 18C, the stiffness is given by:

$$K_t = \frac{Gh^3}{3.5l} \frac{(b_{\max} - b_{\min})}{\ln(b_{\max}/b_{\min})}, \quad 5$$

where the width varies from $b_{max}$ at the substrate support post to $b_{min}$, near the mirror.

For the case of a mirror support structure in which the rotation axis coincides with the center of mass, the resonant frequency depends on the moment of inertia of the mirror element, $J_t$, $$J_t = \frac{\rho L^3 Wt}{12}, \quad 6$$

where ρ is the density of the mirror support structure, L is its length, W is its width (parallel to the axis of rotation), and t its thickness. The resonance frequency is then:

$$f = \frac{1}{2\pi}\sqrt{\frac{K_t}{J_t}}. \quad 7$$

Figure 19:
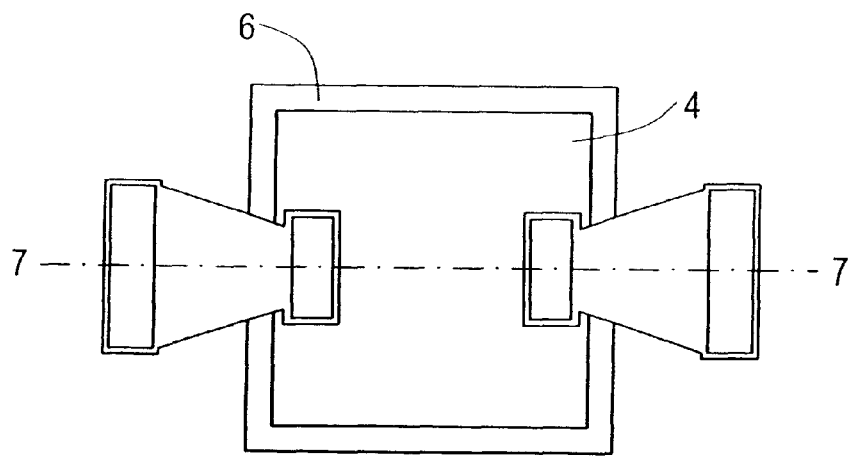
FIG. 19 is a schematic plan view of a micro-mirror with tapered supports.

For a given limiting angle and resonant frequency, the tapered design (FIG. 18C) allows the gap g to be reduced by a factor of:

$$\frac{g_{tapered}}{g_{uniform}} = \frac{\ln \xi}{\xi - 1}, \quad 8$$

where $$\xi = \frac{b_{\max}}{b_{\min}} \quad 9$$

over the gap for the uniform cross section design (FIG. 18A). For aspect ratios ξ less than or approximately equal to 3, the limiting angle is imposed by contact between the spring and base at the narrow end of the spring. FIG. 19 illustrates a micro-mirror with tapered supports.

Figure 20:
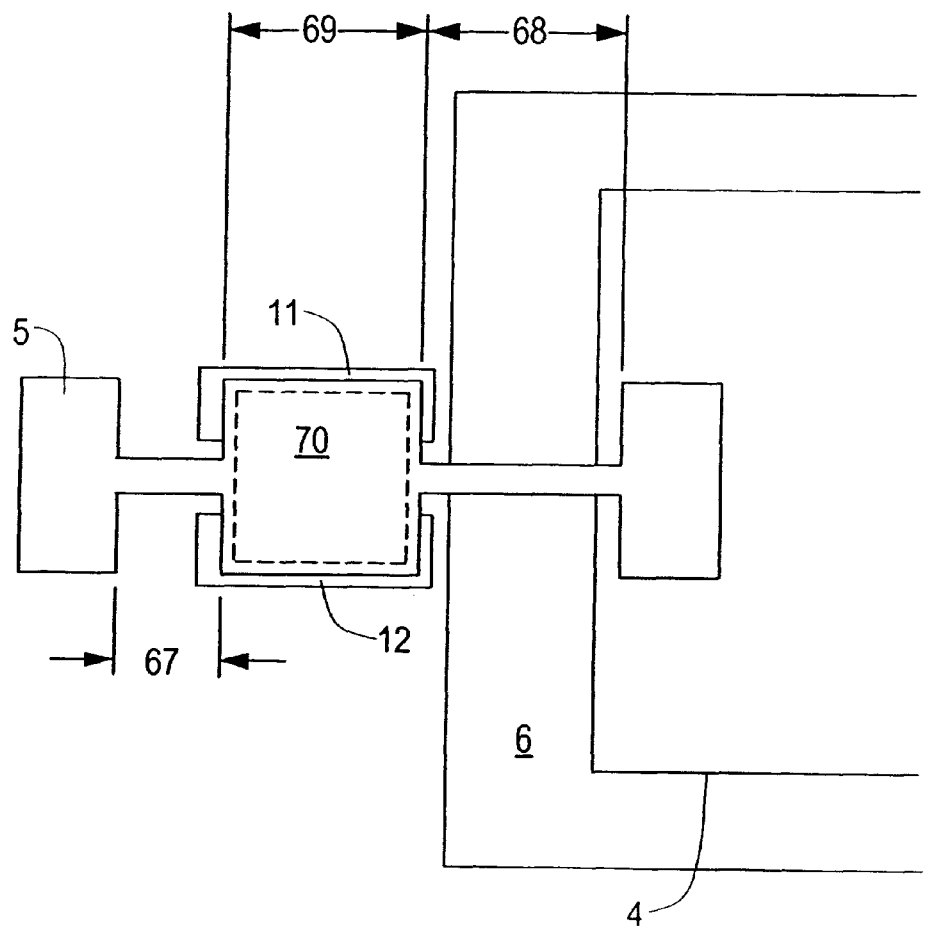
FIG. 20 is a schematic plan view of a micro-mirror with springs having necked down regions.
Figure 21A:
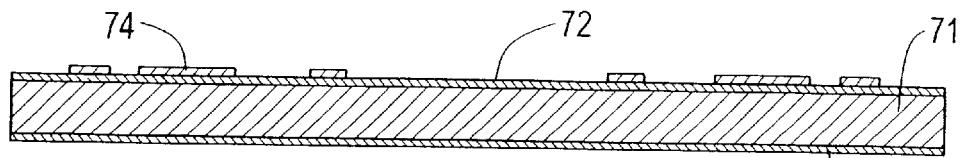
FIGS. 21A–21G are schematic cross-sectional views illustrating a fabrication process for a micro-mirror according to the present invention.
Figure 21B:
Figure 21C:
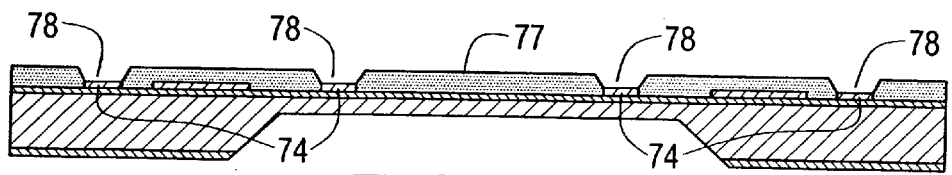
Figure 21D:
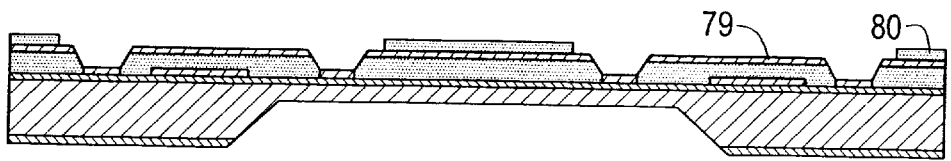
Figure 21E:
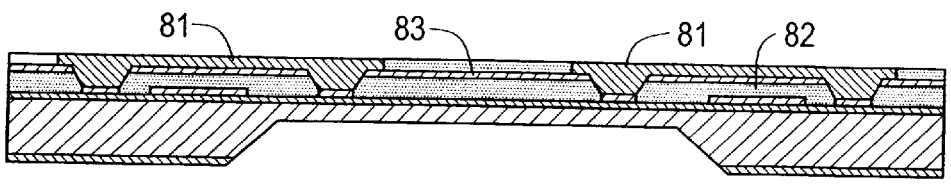
Figure 21F:
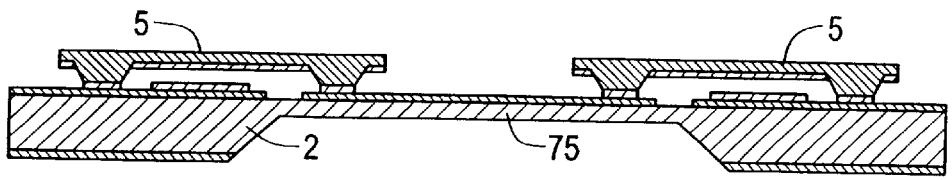
Figure 21G:
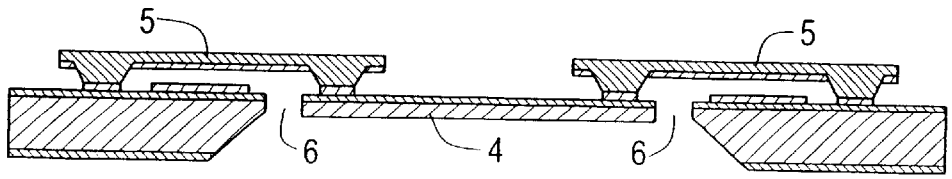

Another design is shown in FIG. 20, in which the spring 5 has two necked down regions 67, 68, which facilitate a high rotation angle. The necked down regions are separated by a wider region 69 which comprises the moving force plate 70 section of spring 5. The force plate 70 of spring 5 is attracted alternately to plates 11 and 12 and can rotate through an angle φ given by the distance 67 (denoted $w_{67}$) and the gap (g), by the equation: $\sin(\phi)=2g/w_{67}$. The mirror support structure 4 can continue to rotate through an additional angle which is limited by the elastic limits of section 68 of spring 5. In general, for rotations of section 67 less than φ and equal to α, the total rotation γ is given by:

$$\gamma = \gamma w_{68}/w_{67}.$$

By selecting the relative lengths of the necked down regions, large angular displacements γ are possible with only a small movement α in the force plate 70 integral to spring 5.

Fabrication

FIG. 21 shows the fabrication process. A polished wafer 71, preferably Si, is first coated on both sides with a material 72 on the front and 73 on the back that is resistant to etches of the wafer material. For silicon, this material may be silicon nitride, silicon dioxide, or other films known in the art. For the case of silicon dioxide to be formed on Si, the wafer may for example be oxidized to form a surface layer of silicon dioxide 72, 73 on both sides of the wafer, or the wafer may be coated by chemical vapor deposition, or by other means. After application of coating 72, 73, the wafer 71 and coatings 72,73 are then patterned on both sides with registered alignment marks and etched to define the marks in the crystal. These marks, formed on both sides of the wafer, permit registration of features on the front and back (registration marks are not shown in FIG. 21).

Metal films, for example of chromium, gold, and titanium/tungsten alloy, are deposited on the front coated surface 72, and are patterned and etched to form pads 74 that provide the electrical contacts and anchors for the mechanical structures. The coating 73 is patterned and etched to act as a mask for wafer etching. The back of the wafer is then etched to form a membrane with surface 75 having thickness in the range of 20 $\mu$m to 200 $\mu$m. A typical thickness is 60 $\mu$m. The coating 72 on the front surface is then patterned and etched to form groove openings 76 in the coating which will serve later in the process as an etch mask for the separation of the mirror support structures 4 from the base 2. The initial coatings may also include or serve as the final mirror surface.

A release layer 77 of photoresist or other material is applied to the front surface and patterned with holes 78 to expose the metal anchors 74. After heat treatment, thin (0.05 $\mu$m to 0.5 $\mu$m) layers of a metal or sequence of metals such as chromium, gold and titanium/tungsten alloy 79 are deposited on the front surface. Photoresist is then applied and patterned to form a mask 80 for the electrodeposited structures. A metal layer 81, which may be nickel, is deposited by electroplating on to the exposed regions 82 of metal layers 74 and 79. The thickness of metal layer 81 is in the range of 0.5 $\mu$m to 10 $\mu$m; layer 81 constitutes the spring 5 in the plan views described earlier. The mask 80 and release layer 77 are removed by dissolving the layers in solvents or preferential etches. This process also removes sections of intermediate metal layers 83 (of metal layer 79) that are not reinforced by the electroplating.

The wafer is diced, and the mirror support structure 4 is separated from the surrounding base 2 by etching both from the front, through the grooves 76 defined in the etch masks 72 and 73, and from the back by etching surface 75, resulting in the formation of cavity 6 surrounding the mirror support structure 4. The mirror support structure 4 is thus joined to the base solely by the metal torsional springs 5. The final thickness of the mirror support structure 4 depends on the duration of the two etch steps and can be selected to yield structures with thickness in the range of 10 to 200 $\mu$m or more (as large as the wafer thickness if needed). Typical final support structure thickness is 30 $\mu$m.

Figure 22A:
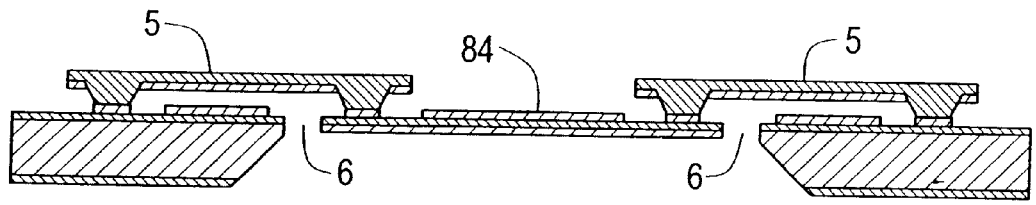
FIG. 22A is a schematic side view illustrating the step in the fabrication process of providing a mirror.
Figure 22B:
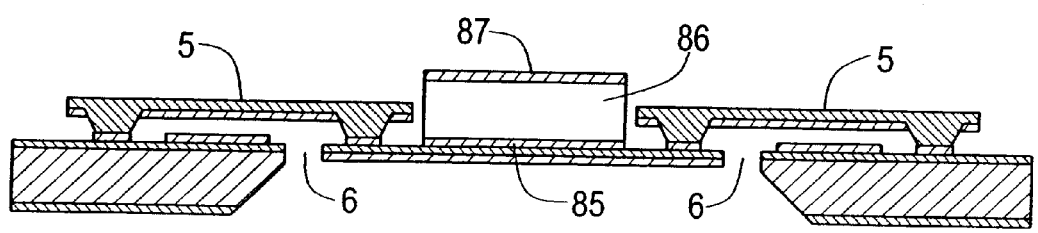
FIG. 22B is a schematic side view illustrating the step in the fabrication process of providing a mirror with an adhesive or other attachment layer, support layer, and a reflecting layer.
Figure 22C:
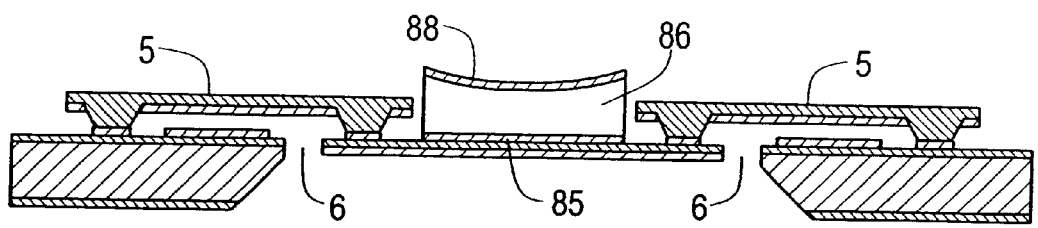
FIG. 22C is a schematic side view illustrating the step in the fabrication process of providing a mirror with an adhesive or other attachment layer and a support layer and a curved reflecting layer.

The final step comprises addition of a mirror, either by providing a metal or dielectric coating 84 (FIG. 22A) of the mirror support structure through a mask (for example with evaporated or sputtered aluminum with thickness in the range of 500 to 2500 angstrom), or by bonding a finished mirror to the support structure. FIG. 22B shows a mirror bonded to the mirror support structure, comprising an adhesive or other attachment layer 85, a glass or other substance 86 as is used in the art of mirror formation to support a reflecting layer, and a flat mirror (reflecting) layer 87. This invention additionally comprises the capability to use a mirror comprising a curved surface formed in material 86 and coated with a reflecting layer 88, as shown in FIG. 22C. This surface on material 86 may be either convex or concave, or aspherical. Additionally, the layers 87 or 88 may comprise a binary optical element of a diffractive or refractive nature, or a holographic element.

Figure 22D:
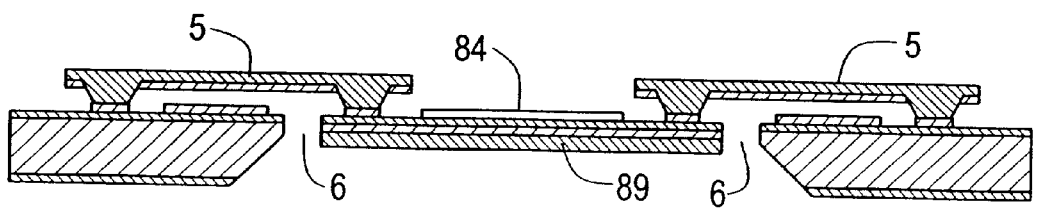
FIG. 22D is a schematic side view illustrating the step in the fabrication process of providing a stress compensating layer.
Figure 23A:
FIGS. 23–23G are schematic side views illustrating the fabrication process of providing a backside patterning.
Figure 23B:
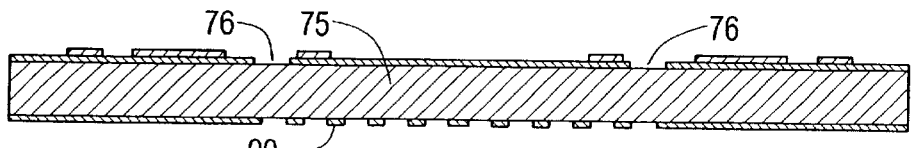
Figure 23C:
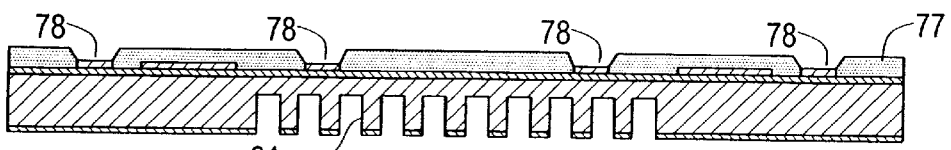
Figure 23D:
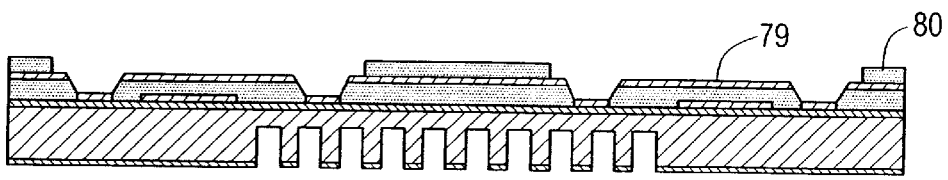
Figure 23E:
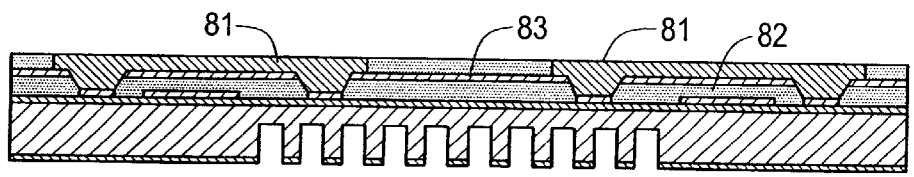
Figure 23F:
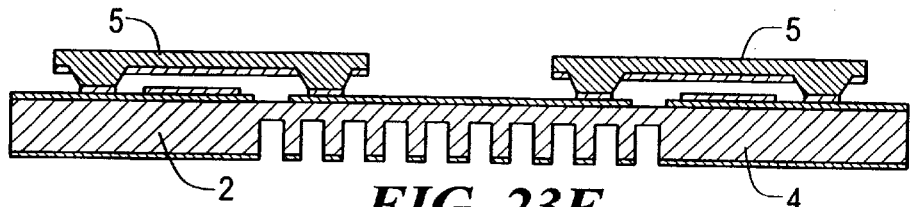
Figure 23G:
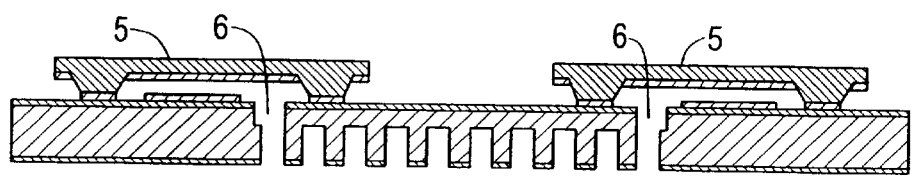

Any of the coatings used in the fabrication process (for example the silicon oxide layer or the optical coatings) may have a high degree of internal stress. If the mirror support structure is sufficiently thin, this stress could induce curvature in the structure. This curvature may be useful, for example for shaping the optical surface, or may be undesirable. In the latter case, if it is not possible or desirable to remove the stressed film, additional layers 89 of equal stress may be deposited on the back face of the structure to compensate for the stress and restore the surface flatness (FIG. 22D). Alternately, the compensating layer may be applied to the front of the support structure, under the mirror, in which case the compensating layer stress would be equal and opposite to the stress already present. If the reflectance of the compensation material is sufficient (e.g. if chromium is used), it may serve as the reflective surface as well.

The mirror thickness is determined by the duration of the etch used to remove the excess material from the back. The choice of thickness results from a tradeoff between mechanical stiffness, moment of inertia, and thermal conductivity. Thicker mirrors are stiffer, and so deform less in use, but the additional mass results in a higher moment of inertia which lowers the resonant frequency. By adding backside patterning of the mirror support structure to the fabrication process as shown in FIG. 23, an engineered mirror support structure can be made, so as to yield a support which is stiff yet low in mass. For example, by adding a patterned mask 90 to the back etching, support ribs could be fabricated 91 on the back of the mirror, perpendicular to the rotation axis, adding stiffness but minimal weight. Alternately a corrugated, honeycomb, or other structure may be formed by etching a pattern of wells into the back of the mirror support structure. Another method that can be applied when the substrate is a single crystal (such as Si) is to pattern the back surface with an array of square openings aligned to the crystal axis, followed by etching in a selective etch (such as potassium hydroxide etching of Si) which etches {111} planes much more slowly than other planes of the crystal. The etching process self terminates when the {111} planes are fully exposed, resulting in a pyramidal etch pit of highly controlled depth. In this way a corrugated structure with a precise resultant mass is formed in the mirror support structure, without the need for a buried etch stop layer.

Structures having a magnetic moment, for use in magnetic actuation, may be electroplated in the same manner as the springs. If the material used for the springs is magnetic, they may be deposited at the same time as the springs. If two different materials are to be used, the magnetic structures may be electroplated in a separate step using a similar processing sequence to that described above. A third option for applying magnetic material to the structure consists of attaching a preformed magnetic element to the completed device by means of an adhesive such as cyanoacrylate adhesive or Crystal Bond wax.

The invention is not to be limited by what has been particularly shown and described, except as indicated by the appended claims.

We claim:

1. A process for fabricating a torsional micro-mechanical mirror system, comprising:

providing a wafer substrate of a substrate material;

providing electrical contact pads and anchors for torsional spring structures on one surface of the wafer;

forming the torsional spring structures on the anchors;

removing a portion of the substrate material to define a mirror support structure separated by a gap from surrounding substrate material; and providing a mirror on the mirror support structure.

2. The process of claim 1, wherein the step of forming the torsional spring structures comprises:

applying a release layer to the one surface of the wafer, the release layer patterned with holes to expose the anchors;

depositing a layer of a conducting material over the release layer to form a portion of the torsional spring structures;

applying and patterning a photoresist layer to form a mask having exposed regions configured to allow deposition of material for the torsional spring structures;

depositing a material to the exposed regions to form the torsional spring structures; and removing the release layer and mask.

3. The process of claim 1, further comprising etching a back surface of the wafer to form a membrane for the mirror support structure.

4. The process of claim 1, wherein the step of providing the mirror comprises providing a metal or dielectric coating to the mirror support structure through a mask.

5. The process of claim 1, wherein the step of providing the mirror comprises bonding a mirror to the mirror support structure.

6. The process of claim 1, wherein the step of providing the mirror comprises bonding a mirror base and a reflecting layer to the mirror support structure.

7. The process of claim 1, wherein the step of providing the mirror comprises bonding a curved mirror to the mirror support structure.

8. The process of claim 1, further comprising applying a stress compensation material to the mirror support structure.

9. The process of claim 1, further comprising forming a stiffening pattern in a back side of the wafer.

10. The process of claim 1, wherein the step of providing a wafer comprises providing a polished wafer.

* * * * *

UNITED STATES PATENT AND TRADEMARK OFFICE
CERTIFICATE OF CORRECTION

PATENT NO.   : 6,353,492 B2
DATED        : March 5, 2002
INVENTOR(S)  : Robert William McClelland et al.

It is certified that error appears in the above-identified patent and that said Letters Patent is hereby corrected as shown below:

Column 4,
Line 39, "150" should read -- 15° --;

Column 8,
Line 46, "23-23G" should read -- 23A-23G --; and

Column 16,
Line 54, "$\gamma=\gamma W_{68}/W_{67}$." should read -- $\gamma=\alpha W_{68}/W_{67}$ . --.

Signed and Sealed this

Twenty-seventh Day of May, 2003

JAMES E. ROGAN
*Director of the United States Patent and Trademark Office*